(12) United States Patent
Jeong

(10) Patent No.: US 11,640,220 B2
(45) Date of Patent: May 2, 2023

(54) TOUCH SENSING UNIT AND DISPLAY DEVICE INCLUDING THE SAME

(71) Applicant: Samsung Display Co., Ltd., Yongin-si (KR)

(72) Inventor: Hwan Hee Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/392,110

(22) Filed: Aug. 2, 2021

(65) Prior Publication Data
US 2021/0365158 A1    Nov. 25, 2021

Related U.S. Application Data

(63) Continuation of application No. 16/792,876, filed on Feb. 17, 2020, now Pat. No. 11,079,890.

(30) Foreign Application Priority Data

Mar. 15, 2019  (KR) .................. 10-2019-0029935

(51) Int. Cl.
  *G06F 3/044*    (2006.01)
  *G06F 3/041*    (2006.01)
(52) U.S. Cl.
  CPC .......... *G06F 3/0446* (2019.05); *G06F 3/0443* (2019.05); *G06F 3/04164* (2019.05)
(58) Field of Classification Search
  CPC .................................................. G06F 3/0412
  See application file for complete search history.

(56) References Cited

U.S. PATENT DOCUMENTS

| 8,722,313 B2 | 5/2014 | Shin |
| 9,229,560 B2 | 1/2016 | Kang et al. |

(Continued)

FOREIGN PATENT DOCUMENTS

| KR | 10-1314779 | 10/2013 |
| KR | 10-2014-0096864 | 8/2014 |

(Continued)

OTHER PUBLICATIONS

Non-Final Office Action dated Oct. 29, 2020, issued to U.S. Appl. No. 16/792,876.

(Continued)

*Primary Examiner* — Nan-Ying Yang
(74) *Attorney, Agent, or Firm* — H.C. Park & Associates, PLC

(57) ABSTRACT

A display device including pixels including a thin film transistor, data lines, a first insulating layer, first and second touch lines, a second insulating layer having contact holes on connecting electrodes, first touch electrodes electrically connected to some of the first touch electrodes by at least one connecting electrode through at least two contact holes, second touch electrodes electrically connected to some of second touch electrodes by an extended portion between second touch electrodes, an integrated circuit, first pads connected to the integrated circuit, guard lines, and second pads including first, second, and third groups, in which each second pad of the first, second, and third group is electrically connected to one first touch line, one second touch line, and one guard line, respectively, and in which one second pad of the third group is between the second pads of the first group and the second group.

20 Claims, 23 Drawing Sheets

(56) References Cited

U.S. PATENT DOCUMENTS

| | | |
|---|---|---|
| 2012/0062487 A1 | 3/2012 | Lee et al. |
| 2014/0049500 A1* | 2/2014 | Chen ..................... G06F 3/0412 |
| | | 349/158 |
| 2017/0115759 A1 | 4/2017 | Chiang et al. |
| 2017/0147116 A1 | 5/2017 | Lee et al. |
| 2017/0249039 A1 | 8/2017 | Kim et al. |
| 2018/0033832 A1* | 2/2018 | Park ..................... G06F 3/0446 |
| 2018/0061748 A1* | 3/2018 | Kim ..................... H01L 23/3171 |
| 2018/0307355 A1 | 10/2018 | Kim et al. |

FOREIGN PATENT DOCUMENTS

| | | |
|---|---|---|
| KR | 10-2016-0020987 | 2/2016 |
| KR | 10-2018-0119196 | 11/2018 |

OTHER PUBLICATIONS

Notice of Allowance dated Mar. 24, 2021, issued to U.S. Appl. No. 16/792,876.

\* cited by examiner

TOUCH SENSING UNIT AND DISPLAY DEVICE INCLUDING THE SAME

CROSS REFERENCE TO RELATED APPLICATIONS

This application is a continuation of U.S. patent application Ser. No. 16/792,876, filed on Feb. 17, 2020, which claims priority from and the benefit of Korean Patent Application No. 10-2019-0029935, filed on Mar. 15, 2019, each of which is hereby incorporated by reference for all purposes as if fully set forth herein.

BACKGROUND

Field

Exemplary embodiments of the invention relate generally to a touch sensing unit and a display device including the same.

Discussion of the Background

An electronic device such as a smartphone, a tablet personal computer (PC), a digital camera, a notebook computer, a navigation device, or a television (TV) that provides images to a user includes a display device. The display device may include a display panel for generating and displaying an image and various input devices.

A touch sensing unit capable of recognizing touch input has been widely used as the input device of a display device, particularly in a smartphone or a tablet PC. The touch sensing unit detects the presence of touch input and calculates the location of touch input as touch input coordinates.

The above information disclosed in this Background section is only for understanding of the background of the inventive concepts, and, therefore, it may contain information that does not constitute prior art.

SUMMARY

A touch sensing unit constructed according to exemplary embodiments of the invention and a display device including the same have an improved touch sensitivity.

Additional features of the inventive concepts will be set forth in the description which follows, and in part will be apparent from the description, or may be learned by practice of the inventive concepts.

A touch sensing unit according to an exemplary embodiment includes a touch sensing area having long sides and short sides, first touch electrodes arranged in the touch sensing area along the long sides of the touch sensing area, second touch electrodes arranged in the touch sensing area along the short sides of the touch sensing area, first connecting electrodes electrically connecting the first touch electrodes, and second connecting electrodes electrically connecting the second touch electrodes, in which a thickness of the second connecting electrodes is different from thicknesses of the first touch electrodes and the second touch electrodes, respectively.

A display unit according to another exemplary embodiment includes a display area, and a touch sensing unit including a touch sensing area overlapping the display area, the touch sensing area having long sides and short sides, in which the touch sensing unit includes first touch electrodes arranged along the long sides of the touch sensing area, second touch electrodes arranged along the short sides of the touch sensing area, first connecting electrodes electrically connecting the first touch electrodes, and second connecting electrodes electrically connecting the second touch electrodes, and a thickness of the second connecting electrodes is different from thicknesses of the first touch electrodes and the second touch electrodes, respectively.

A touch sensing unit according to an exemplary embodiment includes a touch sensing area having long sides and short sides, first touch electrodes arranged in the touch sensing area along the long sides of the touch sensing area, second touch electrodes arranged in the touch sensing area along the short sides of the touch sensing area, first connecting electrodes electrically connecting the first touch electrodes, and second connecting electrodes electrically connecting the second touch electrodes, in which a thickness of the second connecting electrodes is thinner than a thickness of the first connecting electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
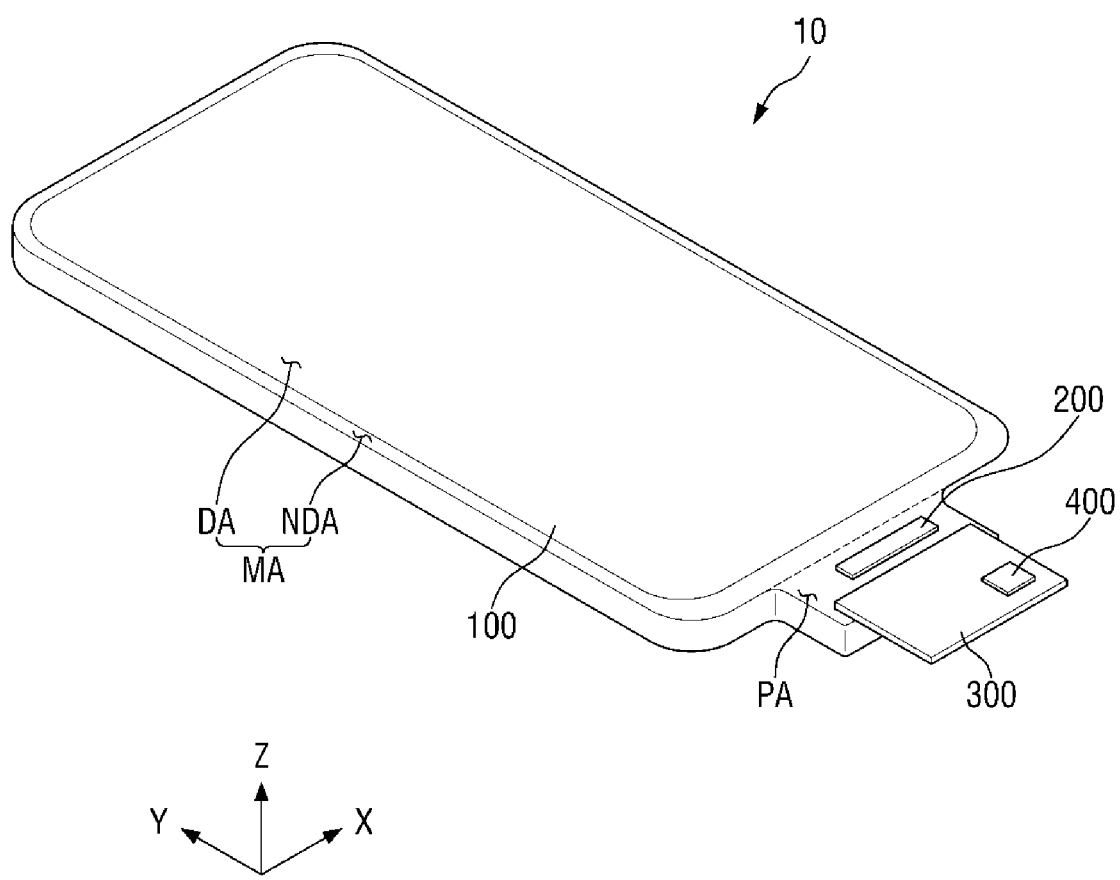
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
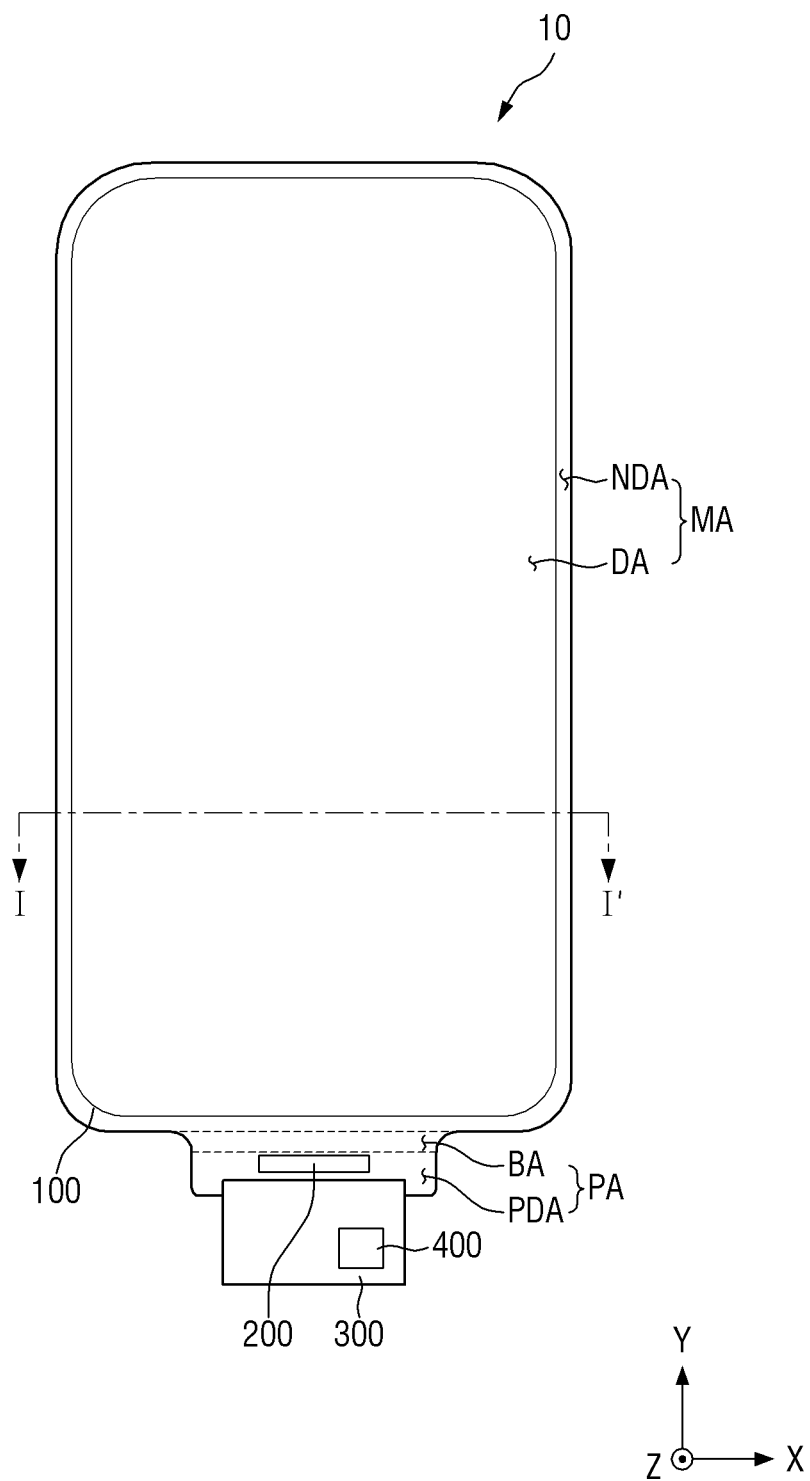
FIG. 2 is a plan view of the display device of FIG. 1.

FIG. 1 is a perspective view of a display device according to an exemplary embodiment. FIG. 2 is a plan view of the display device of FIG. 1.

As used herein, the terms "above", "top", and "top surface" denote an upward direction with respect to a display panel 100, i.e., a Z-axis direction, and the terms "below", "bottom", and "bottom surface" denote a downward direction with respect to the display panel 100, i.e., the direction opposite to the Z-axis direction. Also, the terms "left", "right", "upper", and "lower" denote directions as viewed from above the display panel 100. For example, the term "left" denotes the direction opposite to an X-axis direction, the term "right" denotes the X-axis direction, the term "upper" denotes a Y-axis direction, and the term "lower" denotes the direction opposite to the Y-axis direction.

Referring to FIGS. 1 and 2, a display device 10, which displays moving or still images, may be used as a display screen not only for a mobile electronic device (e.g., a mobile phone, a smartphone, a tablet personal computer (PC), a smartwatch, a watch phone, a mobile communication terminal, an electronic notebook, an electronic book, a portable multimedia player (PMP), a navigation device, or an ultra-mobile PC (UMPC)), but also for various other products, such as a television (TV), a notebook computer, a monitor, a billboard, and an Internet of Things (IoT) device. The display device 10 may be one of an organic light-emitting diode (OLED) display device, a liquid crystal display (LCD) device, a plasma display panel (PDP) device, a field emission display (FED) device, an electrophoretic display (EPD) device, an electrowetting display device, a quantum dot light-emitting diode (QLED) display device, and a micro light-emitting diode (mLED) display device. The display device 10 will hereinafter be described as being an OLED display device, but the inventive concepts are not limited thereto.

The display device 10 includes the display panel 100, a display driving circuit 200, a circuit board 300, and a touch driving circuit 400.

The display panel 100 may include a main area MA and a protruding area PA that protrudes from one side of the main area MA.

The main area MA may be formed as a rectangular plane having a pair of short sides that extend in a first direction (or the X-axis direction) and a pair of long sides that extend in a second direction (or the Y-axis direction) intersecting the first direction (or the X-axis direction. The corners at which the short sides and the long sides of the main area MA meet may be rounded to have a predetermined curvature or may be right-angled. The planar shape of the display device 10 is not particularly limited, and the display device 10 may be formed in various shapes such as a polygonal, circular, or elliptical shape. The main area MA may be formed to be generally flat, but the inventive concepts are not limited thereto. In some exemplary embodiments, the main area MA may have curved parts on both sides thereof, in which case, the curved parts may have a uniform or variable curvature.

The main area MA may include a display area DA, in which pixels are formed to display an image, and a non-display area NDA, which is peripheral to the display area DA.

In the display area DA, not only the pixels, but also scan lines, data lines, and a power line connected to the pixels, may be disposed. When the main area MA includes curved parts, the display area DA may also be disposed in the curved parts, and in this case, an image displayed by the display panel 100 can be viewed even in the curved parts.

The non-display area NDA may be defined as an area ranging from the outer sides of the display area DA to the edges of the display panel 100. In the non-display area NDA, a scan driver 110 (see FIG. 4) for applying scan signals to the scan lines, and link lines for connecting the data lines and the display driving circuit 200 may be disposed.

The protruding area PA may protrude from one side of the main area MA. For example, as illustrated in FIG. 2, the protruding area PA may protrude from the lower side of the main area MA. The length, in the first direction (or the X-axis direction), of the protruding area PA may be smaller than the length, in the first direction (or the X-axis direction), of the main area MA.

The protruding area PA may include a bending area BA and a pad area PDA. The pad area PDA may be disposed on one side of the bending area BA, and the main area MA may be disposed on the other side of the bending area BA. For example, the pad area PDA may be disposed on the lower side of the bending area BA, and the main area MA may be disposed on the upper side of the bending area BA.

The display panel 100 may be formed to be flexible, and may thus be bendable, rollable, or foldable. Accordingly, the display panel 100 can be bent in the bending area BA in the opposite direction of a third direction (or the opposite direction of the Z-axis direction). The pad area PDA of the display panel 100 may face upward when the display panel 100 is yet to be bent, and may face upward or downward when the display panel 100 is bent. When the display panel 100 is bent, the pad area PDA may be placed below the main area MA and may overlap with the main area MA.

In the pad area PDA of the display panel 100, pads that are electrically connected to the display driving circuit 200 and the circuit board 300 may be disposed.

The display driving circuit 200 may output signals and voltages for driving the display panel 100. For example, the display driving circuit 200 may provide data voltages to the data lines. Also, the display driving circuit 200 may provide a power voltage to the power line, and may provide scan control signals to the scan driver 110. The display driving circuit 200 may be formed as an integrated circuit (IC), and may then be mounted on the display panel 100, particularly, in the pad area PDA, in a chip-on-glass (COG) or chip-on-plastic (COP) manner or through ultrasonic bonding, without being limited thereto. In some exemplary embodiments, the display driving circuit 200 may be mounted on the circuit board 300.

The pads may include display pads that are electrically connected to the display driving circuit 200 and touch pads that are electrically connected to touch lines.

The circuit board 300 may be attached to the pads via an anisotropic conductive film. As such, the lead lines of the circuit board 300 can be electrically connected to the pads. The circuit board 300 may be a flexible film, such as a flexible printed circuit board (FPCB), a printed circuit board (PCB), or a chip-on-film (COF).

The touch driving circuit 400 may be connected to touch electrodes of a touch sensor layer TSL of the display panel 100. The touch driving circuit 400 applies driving signals to the touch electrodes of the touch sensor layer TSL and measures the capacitances of the touch electrodes. The driving signals may be signals having multiple driving pulses. The touch driving circuit 400 not only can determine the presence of touch input, but also can calculate the touch coordinates of touch input, based on the capacitances of the touch electrodes.

The touch driving circuit 400 may be disposed on the circuit board 300. The touch driving circuit 400 may be formed as an IC, and may then be mounted on the circuit board 300.

Figure 3:
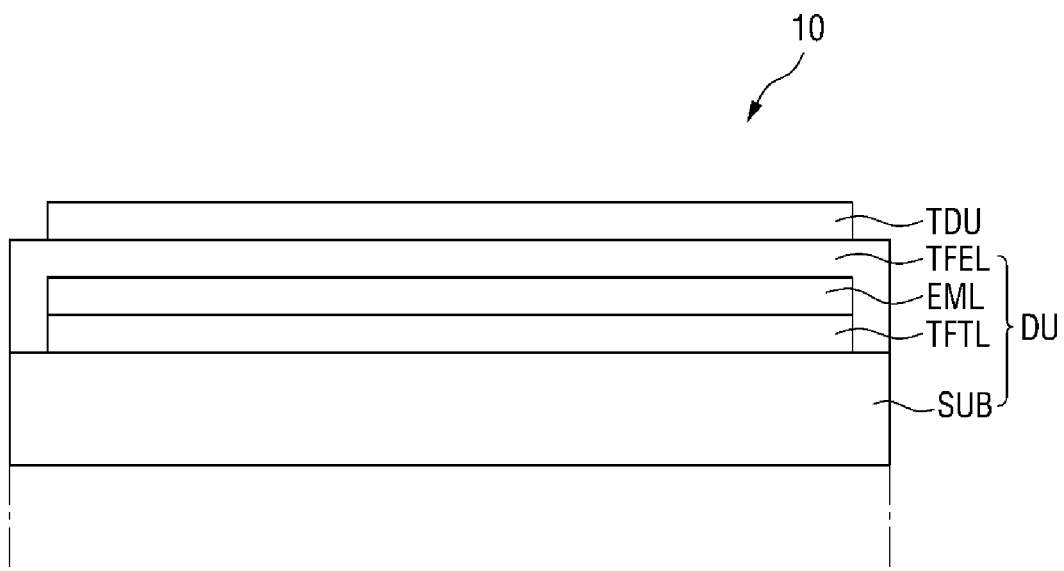
FIG. 3 is a cross-sectional view taken along line I-I' of FIG. 2.

FIG. 3 is a cross-sectional view taken along line I-I' of FIG. 2.

Referring to FIG. 3, the display panel 100 may include a display unit DU and a touch sensing unit TDU, which is disposed on the display unit DU. The display unit DU may include a substrate SUB, a thin-film transistor (TFT) layer TFTL, a light-emitting element layer EML, and a thin-film encapsulation layer TFEL.

The substrate SUB may be formed of an insulating material, such as glass, quartz, or a polymer resin. For example, the substrate SUB may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. As another example, the substrate SUB may include metal.

The substrate SUB may be a rigid substrate or may be a flexible substrate that is bendable, foldable, or rollable. When the substrate SUB is a flexible substrate, the substrate SUB may include polyimide without being limited thereto.

Figure 4:
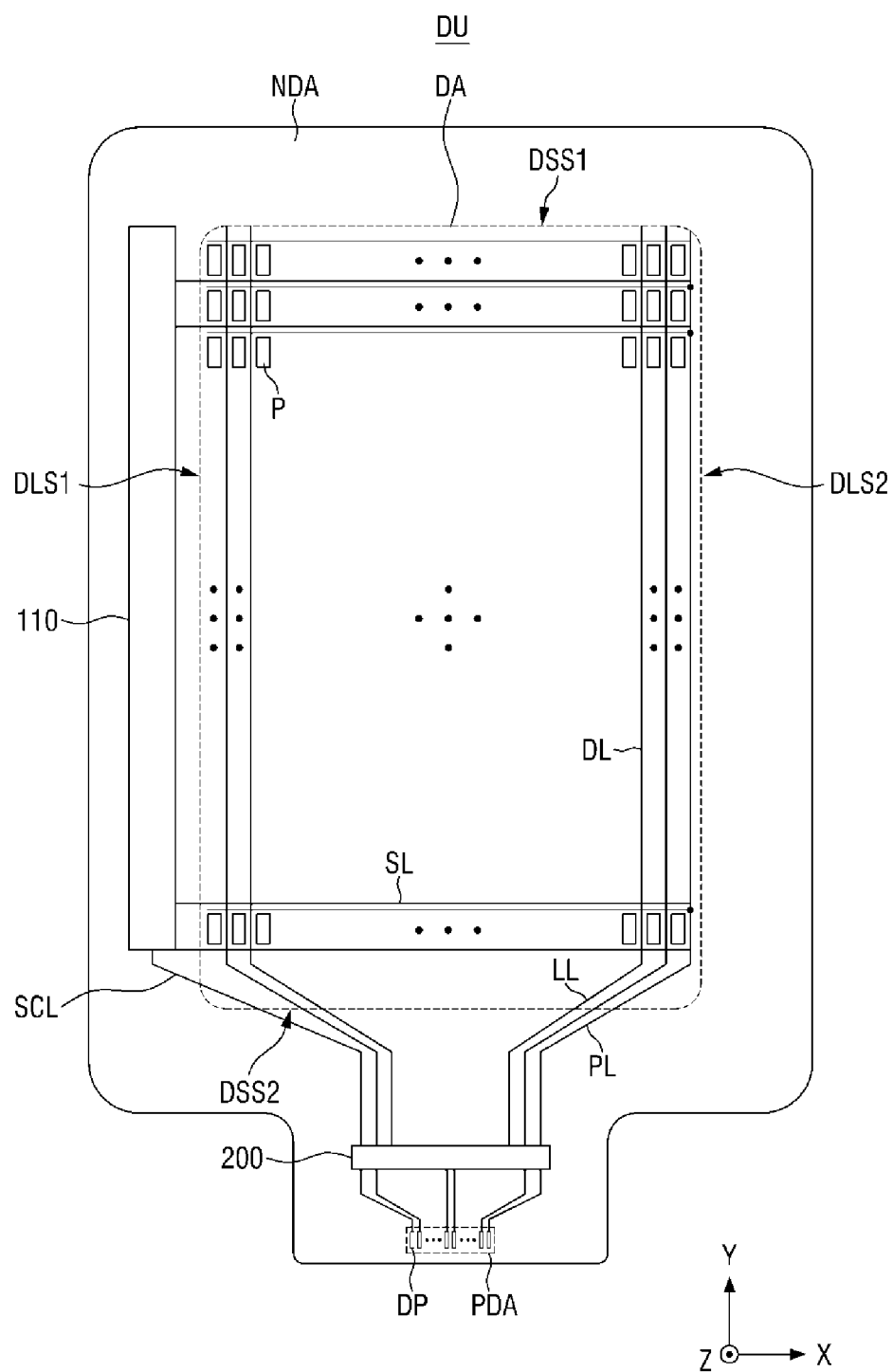
FIG. 4 is a layout view of a display unit of FIG. 3 according to an exemplary embodiment.

The TFT layer TFTL may be disposed on the substrate SUB. In the TFT layer TFTL, not only the TFTs of the pixels, but also the scan lines, the data lines, the power line, scan control lines, and routing lines connecting the pads and the data lines, may be formed. Each of the TFTs may include a gate electrode, a semiconductor layer, a source electrode, and a drain electrode. When the scan driver 110 is formed in the non-display area NDA of the display panel 100, as illustrated in FIG. 4, the scan driver 110 may include the TFTs.

The TFT layer TFTL may be disposed in the display area DA and in the non-display area NDA. Specifically, the TFTs of the pixels, the scan lines, the data lines, and the power line may be disposed in the display area DA. The scan control lines and the link lines may be disposed in the non-display area NDA.

The light-emitting element EML may be disposed on the TFT layer TFTL. The light-emitting element layer EML may include the pixels, each having a first electrode, a light-emitting layer, and a second electrode, and a pixel-defining film defining the pixels. The light-emitting layer may include an organic material. In this case, the light-emitting layer may include a hole transport layer, an organic light-emitting layer, and an electron transport layer. In response to a predetermined voltage applied to the first electrode and a cathode voltage applied to the second electrode, holes and electrons may move to the organic light-emitting layer through the hole transport layer and the electron transport layer, and may be combined together to emit light. The pixels of the light-emitting layer EML may be disposed in the display area DA.

The thin-film encapsulation layer TFEL may be disposed on the light-emitting element layer EML. The thin-film encapsulation layer TFEL prevents oxygen or moisture from infiltrating into the light-emitting element layer EML. To this end, the thin-film encapsulation layer TFEL may include at least one inorganic film. The inorganic film may be a silicon nitride layer, a silicon oxynitride layer, a silicon oxide layer, a titanium oxide layer, or an aluminum oxide layer, without being limited thereto. Also, the thin-film encapsulation layer TFEL protects the light-emitting element layer EML against foreign materials, such as dusts. To this end, the thin-film encapsulation layer TFEL may include at least one organic film. The organic film may include an acrylic resin, an epoxy resin, a phenolic resin, a polyamide (PA) resin, or a PI resin, without being limited thereto.

The thin-film encapsulation layer TFEL may be disposed in both the display area DA and the non-display area NDA. Specifically, the thin-film encapsulation layer TFEL may be disposed to cover the light-emitting element layer EML in both the display area DA and the non-display area NDA, and to cover the TFT layer TFTL in the non-display area NDA.

The touch sensing unit TDU may be disposed on the thin-film encapsulation layer TFEL. Since the touch sensing unit TDU according to an exemplary embodiment can be disposed directly on the thin-film encapsulation layer TFEL, the thickness of the display device 10 can be reduced as compared to a case where an additional touch panel including the touch sensor layer TSL is attached to the thin-film encapsulation layer TFEL.

The touch sensing unit TDU may include touch electrodes for detecting touch input from a user in a capacitive manner, and touch lines connecting the touch electrodes. For example, the touch sensing unit TDU may detect touch input from the user in a self-capacitance manner or in a mutual capacitance manner.

Figure 5:
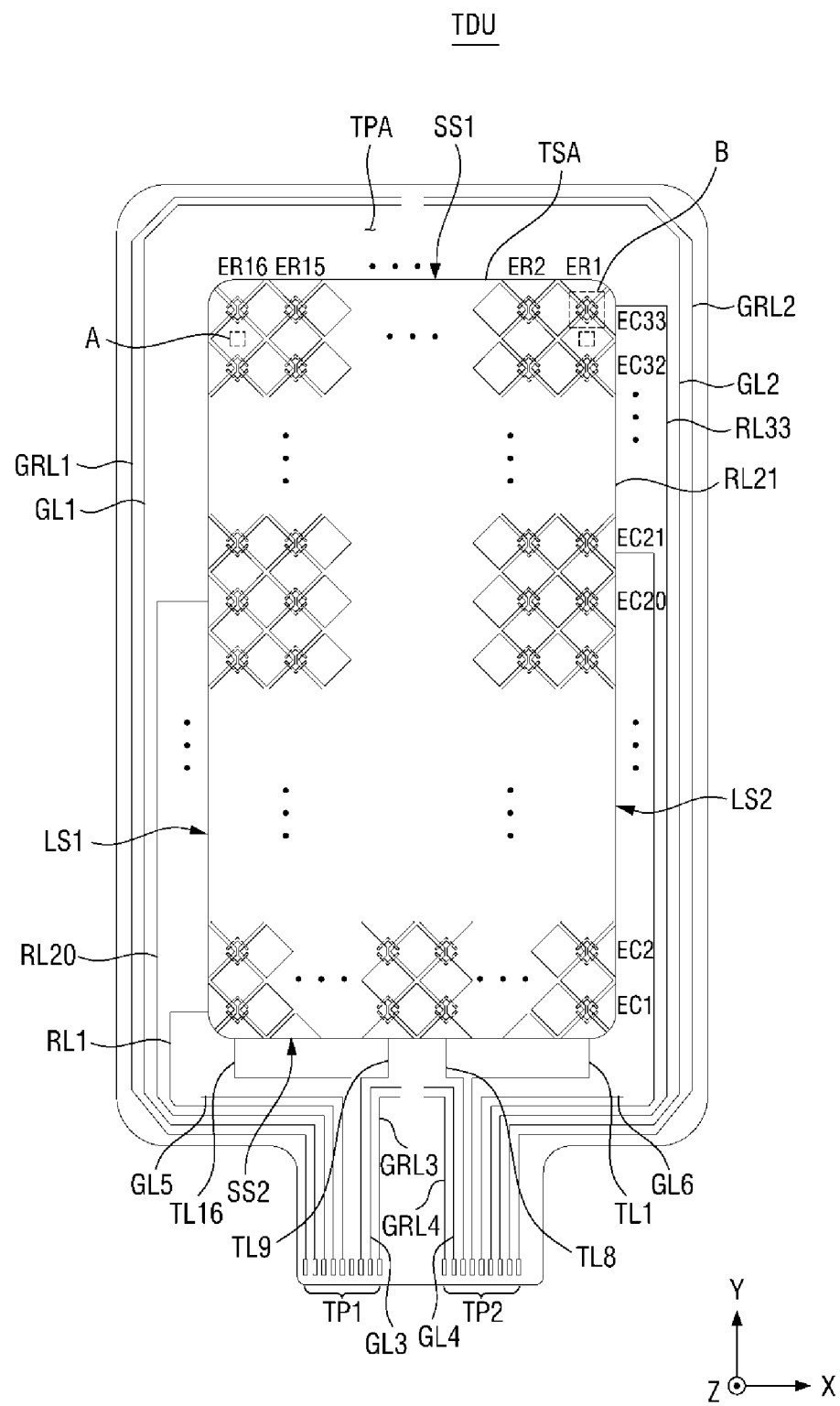
FIG. 5 is a layout view of a touch sensing unit according to an exemplary embodiment.

The touch electrodes of the touch sensing unit TDU may be disposed in a touch sensor area TSA, as illustrated in FIG. 5. The touch lines of the touch sensing unit TDU may be disposed in a touch peripheral area TPA which overlaps with the non-display area NDA, as illustrated in FIG. 5.

According to an exemplary embodiment, a passivation layer may be disposed on the touch sensing unit TDU. The passivation layer may include, for example, a window member. The passivation layer may be attached on the touch sensing unit TDU via an optically clear adhesive (OCA). In some exemplary embodiments, the display device 10 may further include an optical member. For example, an optical member, such as a polarizing film, may be interposed between the touch sensing unit TDU and the passivation layer.

FIG. 4 is a layout view of the display unit of FIG. 3.

FIG. 4 exemplarily illustrates only pixels P, scan lines SL, data lines DL, a power line PL, scan control lines SCL, the scan driver 110, the display driving circuit 200, and display pads DP.

Referring to FIG. 4, the display unit DU may include the display area DA and the non-display area NDA. The display area DA may include first and second display short sides DSS1 and DSS2 which extend in the first direction (or the X-axis direction) and are opposite to each other in the second direction (or the Y-axis direction), and first and second display long sides DLS1 and DLS2 which extend in the second direction (or the Y-axis direction) and are opposite to each other in the first direction (or the X-axis direction). The corners at which the first and second display long sides DLS1 and DLS2 and the first and second display short sides DSS1 and DSS2 meet may be rounded to have a predetermined curvature, but the inventive concepts are not limited thereto. For example, in some exemplary embodiments, the corners at which the first and second display long sides DLS1 and DLS2 and the first and second display short sides DSS1 and DSS2 meet may be cut off.

The scan lines SL, the data lines DL, the power line PL, and the pixels P are disposed in the display area DA. The scan lines SL may be formed to be substantially parallel to one another in the first direction (or the X-axis direction), and the data lines DL may be formed to be substantially parallel to one another in the second direction (or the Y-axis direction), which intersects the first direction (or the X-axis direction). The power line PL may include at least one line extending substantially in parallel to the data lines DL in the second direction (or the Y-axis direction) and a plurality of lines branched off from the at least one line in the first direction (or the X-axis direction).

Each of the pixels P may be connected to one of the scan lines SL, one of the data lines DL, and the power line PL. Each of the pixels P may include TFTs, an OLED, and a capacitor, and the TFTs may include a driving transistor and at least one switching transistor. In response to a scan signal applied from the scan lines SL, the pixels P may receive data voltages from the data lines DL, and may emit light by applying driving currents to the OLEDs thereof in accordance with the data voltages applied to the gate electrodes thereof.

The scan driver 110 may be connected to the display driving circuit 200 via at least one scan control line SCL. Accordingly, the scan driver 110 can receive scan control signals from the display driving circuit 200. The scan driver 110 may generate scan signals in accordance with the scan control signals, and may provide the scan signals to the scan lines SL.

FIG. 4 illustrates that the scan driver 110 is disposed in a part of the non-display area NDA on the left side the display area DA, but the inventive concepts are not limited thereto. For example, in some exemplary embodiments, the scan driver 110 may be disposed not only in the part of the non-display area NDA on the left side the display area DA, but also in a part of the non-display area NDA on the right side of the display area DA.

The display driving circuit 200 is connected to the display pads DP, which are disposed in the pad area PDA, and receives digital video data and timing signals. The display driving circuit 200 converts the digital video data into positive/negative analog data voltages, and provides the positive/negative analog data voltages to the data lines DL via the link lines LL. Also, the display driving circuit 200 generates scan control signals for controlling the scan driver 110, and provides the scan control signals via the scan control lines SCL. Pixels P to which data voltages are to be provided are selected by scan signals from the scan driver 110, and data voltages are provided to the selected pixels P. The display driving circuit 200 may be formed as an IC, and may be attached to the substrate SUB in a COG or COP manner or through ultrasonic bonding.

FIG. 5 is a layout view of a touch sensing unit according to an exemplary embodiment. FIG. 5 exemplarily illustrates only first and second touch electrodes TE and RE (see FIG. 19), first touch lines TL1 through TL16, second touch lines RL1 through RL33, first touch pad portions TP1, and second touch pad portions TP2. The first touch lines TL1 through TL16 will hereinafter be referred to as the first through sixteenth driving lines TL1 through TL16, respectively, and the second touch lines RL1 through RL33 will hereinafter be referred to as the first through thirty-third sensing lines RL1 through RL33, respectively.

Referring to FIG. 5, the touch sensing unit TDU includes the touch sensor area TSA, through which touch input from the user may be detected, and the touch peripheral area TPA disposed on the periphery of the touch sensor area TSA. The touch sensor area TSA may overlap with the display area DA of the display unit DU, and the touch peripheral area TPA may overlap with the non-display area NDA of the display unit DU.

The touch sensor area TSA may include first and second short sides SS1 and SS2 which extend in the first direction (or the X-axis direction) and are opposite to each other in the second direction (or the Y-axis direction), and first and second long sides LS1 and LS2 which extend in the second direction (or the Y-axis direction) and are opposite to each other in the first direction (or the X-axis direction). The corners at which the first and second short sides SS1 and SS2 and the first and second long sides LS1 and LS2 meet may be rounded to have a predetermined curvature, without being limited thereto. For example, in some exemplary embodiment embodiments, the corners at which the first and second short sides SS1 and SS2 and the first and second long sides LS1 and LS2 meet may be cut off.

The first short side SS1 and the first display short side DSS1 may overlap with each other, and may have substantially the same length. The second short side SS2 and the second display short side DSS2 may overlap with each other and may have substantially the same length. The first long side LS1 and the first display long side LSS1 may overlap with each other and may have substantially the same length, and the second long side LS2 and the second display long side LSS2 may overlap with each other and may have substantially the same length. However, the inventive concepts are not limited thereto. In some exemplary embodiments, the first and second short sides SS1 and SS2 and the first and second long sides LS1 and LS2 of the touch sensor area TSA may have different lengths from the first and second display short sides DSS1 and DSS2 and the first and second display long sides LSS1 and LSS2 of the display area DA, respectively, and the touch sensor area TSA may have a different shape from the display area DA.

In the touch sensor area TSA, touch electrodes (TE and RE) may be disposed. The touch electrodes (TE and RE) may include the first touch electrodes TE and the second touch electrodes RE. The first touch electrodes TE and the second touch electrodes RE may be driving electrodes and sensing electrodes, respectively, or vice versa. The first touch electrodes TE and the second touch electrodes RE will hereinafter be described as being driving electrodes and sensing electrodes, respectively.

In the touch sensor area TSA, 16 first touch electrodes TE may be arranged along the first direction (or the X-axis direction), and 33 second touch electrodes RE may be arranged along the second direction (or the Y-axis direction). More particularly, the touch electrodes (TE and RE) may be arranged in 33 rows (EC1 through EC33) and 16 columns (ER1 through ER16), the first touch electrode TE may be arranged in the 16 columns (ER1 through ER16), and the second touch electrodes RE may be arranged in the 33 rows (EC1 through EC33). However, the inventive concepts are not limited thereto, and the numbers and the arrangement of first touch electrodes TE and second touch electrodes RE disposed in the touch sensor area TSA may be variously modified.

The touch electrodes (TE and RE) may have a rhombic shape, without being limited thereto. In some exemplary embodiments, the touch electrodes (TE and RE) may have various other shapes, such as a triangular, rectangular, pentagonal, circular, or bar shape. The first touch electrodes TE and the second touch electrodes RE are illustrated as having the same shape, but the inventive concepts are not limited thereto. In some exemplary embodiments, the first touch electrodes TE may have a different shape, a different area, and/or a different thickness from the second touch electrodes RE. According to an exemplary embodiment, each of the touch electrodes (TE and RE) may have a mesh structure, in which a plurality of openings are formed.

Figure 19:
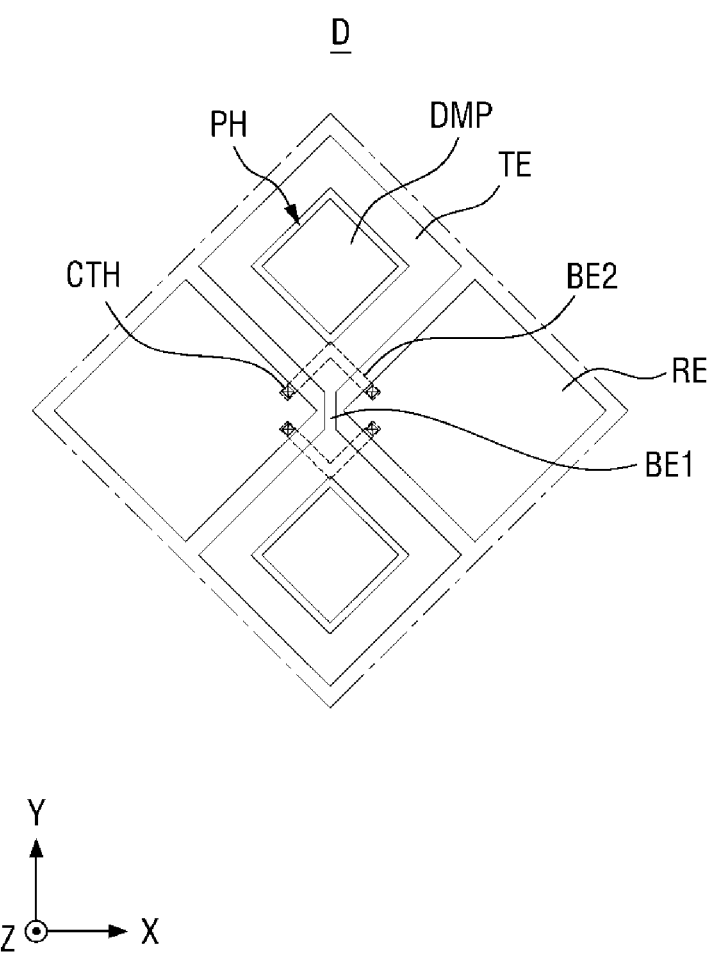
FIG. 19 is an exemplary enlarged layout view of an area D of FIG. 18.

The first touch electrode TE may be electrically connected in the second direction (or the Y-axis direction) via first connecting electrodes BE1 (see FIG. 19), and the second touch electrode RE may be electrically connected in the first direction (or the X-axis direction), which intersects the second direction (or the Y-axis direction), via second connecting electrodes BE2 (see FIG. 19). The touch sensing unit TDU, which has a major axis and a minor axis, may have larger sensitivity deviations in the major axis direction than in the minor axis direction, and the touch sensitivity of the entire touch sensing unit TDU may decrease depending on the sensitivity deviations in the major axis direction. Accordingly, the second connecting electrodes BE2 may connect the second touch electrodes RE, which are arranged in the minor axis direction of the touch sensing unit TDU, in the first direction (or the X-axis direction), to reduce the resistance of the first touch electrodes TE, which are arranged in the major axis direction of the touch sensing unit TDU, to effectively reduce the sensitivity deviations in the first touch electrodes TE. In this manner, the touch sensitivity of the entire touch sensing unit TDU can be improved.

In order to prevent the first touch electrodes TE and the second touch electrodes RE from being short-circuited at the intersections therebetween, the first connecting electrodes BE1 and the second connecting electrodes BE2 may be disposed in different layers. The lamination structure of the first touch electrodes TE, the second touch electrodes RE, the first connecting electrodes BE1, and the second connecting electrodes BE2 will be described later.

The first through sixteenth driving lines TL1 through TL16 and the first through thirty-third sensing lines RL1 through RL33 may be disposed in the touch peripheral area TPA. The first through sixteenth driving lines TL1 through TL16 may be electrically connected to the first touch electrodes TE, and the first through thirty-third sensing lines RL1 through RL33 may be electrically connected to the second touch electrodes RE. Specifically, the first touch electrodes TE may be electrically connected in the second direction (or the Y-axis direction). The first through sixteenth driving lines TL1 through TL16 may be connected to first touch electrodes TE disposed at one end, in the second direction (or the Y-axis direction), of the touch sensor area TSA.

For example, as illustrated in FIG. 5, the first through sixteenth driving lines TL1 through TL16 may be connected to first touch electrodes TE in one-on-one arrangement, at the lower end of the touch sensor area TSA that correspond to the first through sixteenth columns ER1 through ER16. The first driving line TL1 may be connected to the closest first touch electrode TE to the second short side SS2 among the first touch electrodes TE in the first column ER1, which is disposed on the far right side of the touch sensor area TSA. The sixteenth driving line TL16 may be connected to the closest first touch electrode TE to the second short side SS2 among the first touch electrodes TE in the sixteenth column ER16, which is disposed on the far left side of the touch sensor area TSA. Referring to FIG. 5, the first column ER1 is the far right column in the touch sensor area TSA, the sixteenth column ER16 is the far left column in the touch sensor area TSA, and the second through fifteenth columns ER2 through ER15 are sequentially arranged between the first and sixteenth columns ER1 and ER16.

The second touch electrodes RE are electrically connected in the first direction (or the X-axis direction). The first through thirty-third sensing lines RL1 through RL33 are electrically connected to second touch electrodes RE disposed on one or the other side of the touch sensor area TSA. The first through thirty-third sensing lines RL1 through RL33 may be divided between the left and right sides of the touch sensor area TSA.

For example, as illustrated in FIG. 5, the first through twentieth sensing lines RL1 through RL20 may be disposed on the left side of the touch sensor area TSA. The first through twentieth sensing lines RL1 through RL20 may be connected in one-on-one arrangement to second touch electrodes RE on the left side of the touch sensor area TSA that correspond to the first through twentieth rows EC1 through EC20. The first sensing line RL1 may be connected to the closest second touch electrode RE to the first long side LS2 among the second touch electrodes RE in the first row EC1, which is the lowermost column in the touch sensor area TSA. The twentieth sensing line RL20 may be connected to the closest second touch electrode RE to the first long side LS1 among the second touch electrodes RE in the twentieth row EC20. Referring to FIG. 5, the first row EC1 is the lowermost row in the touch sensor area TSA, and the second through twentieth rows EC2 through EC20 are sequentially arranged next to the first row EC1 along the second direction (or the Y-axis direction).

The twenty-first through thirty-third sensing lines RL21 through RL33 may be disposed on the right side of the touch sensor area TSA. The twenty-first through thirty-third sensing lines RL21 through RL33 may be connected in one-on-one arrangement to second touch electrodes RE on the right side of the touch sensor area TSA that correspond to the twenty-first through thirty-third rows EC21 through EC33. The twenty-first sensing line RL21 may be connected to the closest second touch electrode RE to the second long side LS2 among the second touch electrodes RE in the twenty-first row EC21. The thirty-third sensing line RL33 may be connected to the closest second touch electrode RE to the second long side LS2 among the second touch electrodes RE in the thirty-third row EC33. Referring to FIG. 5, the twenty-second through thirty-second rows EC22 through EC32 are sequentially arranged next to the twenty-second row EC21 along the second direction (or the Y-axis direction).

The first through twentieth sensing lines RL1 through RL20 may be defined as a first sensing line group or a first second-touch line group, and the twenty-first through thirty-third sensing lines RL21 through RL33 may be defined as a second sensing line group or a second second-touch line group. In this case, the sensing lines included in the first sensing line group may be disposed on the left side of the touch sensor area TSA, and the sensing lines included in the second sensing line group may be disposed on the right side of the touch sensor area TSA. In this manner, sensitivity deviations can be more effectively reduced than a configuration where sensing lines are alternately arranged in odd- and even-numbered rows, thereby improving the touch sensitivity of the touch sensing unit TDU.

The first sensing line group may include 20 sensing lines, and the second sensing line group may include 13 sensing lines. That is, the number of sensing lines included in the first sensing line group may be different from the number of sensing lines included in the second sensing line group. Since the sensing lines included in the second sensing line group are longer than the sensing lines included in the first sensing line group, any resistance deviations between the first sensing line group and the second sensing line group can be minimized by forming the sensing lines included in the second sensing line group to be wider than the sensing lines included in the first sensing line group.

A first guard line GL1 may be disposed between a first ground line GRL1 and the twentieth sensing line RL20 to surround part of the lower side of the touch sensor area TSA, the left side of the touch sensor area TSA, and part of the upper side of the touch sensor area TSA. A second guard line GL2 may be disposed between a second ground line GRL2 and the thirty-third sensing line RL33 to surround part of the lower side of the touch sensor area TSA, the right side of the touch sensor area TSA, and part of the upper side of the touch sensor area TSA. The ends of the first and second guard lines GL1 and GL2 may face each other on the upper side of the touch sensor area TSA, and may be spaced apart from each other in the first direction (or the X-axis direction).

A third guard line GL3 may be disposed between a third ground line GRL3 and the ninth driving line TL9 to face part of the lower side of the touch sensor area TSA. A fourth guard line GL4 may be disposed between a fourth ground line GRL4 and the eighth driving line TL8 to face part of the lower side of the touch sensor area TSA. A fifth guard line GL5 may be disposed between the first sensing line RL1 and the sixteenth driving line TL16, and a sixth guard line GL6 may be disposed between the twenty-first sensing line RL21 and the first driving line TL1.

The first ground line GRL1 may be disposed on the left side of the first guard line GL1 to surround the first guard line GL1. The second ground line GRL2 may be disposed on the right side of the second guard line GL2 to surround the second guard line GL2. The third ground line GRL3 may be connected to the far right first touch pad portion TP1. The fourth ground line GRL4 may be connected to the far left second touch pad portion TP2.

The first and second ground lines GRL1 and GRL2 may be disposed along the outermost part of the touch sensing unit TDU on the left side, the upper side, and the right side of the touch sensing unit TDU. The third and fourth ground lines GRL3 and GRL4 may be disposed on the lower side of the touch sensing unit TDU. Accordingly, the touch sensor area TSA, the first through sixteenth driving lines TL1 through TL16, and the first through thirty-third sensing lines RL1 through RL33 may be surrounded by the first, second, third, and fourth ground lines GRL1, GRL2, GRL3, and GRL4. In this manner, any static electricity applied from the outside can be discharged to the first, second, third, and fourth ground lines GRL1, GRL2, GRL3, and GRL4. As such, the touch sensor area TSA, the first through sixteenth driving lines TL1 through TL16, and the first through thirty-third sensing lines RL1 through RL33 can be protected from static electricity.

The first guard line GL1 may minimize the influence of voltage variations in the first ground line GRL1 on the first through twentieth sensing lines RL1 through RL20. The second guard line GL2 may minimize the influence of voltage variations in the second ground line GRL2 on the twenty-first through thirty-third sensing lines RL21 through RL33. The third guard line GL3 may minimize the influence of voltage variations in the third ground line GRL3 on the ninth through sixteenth driving lines TL9 through TL16. The fourth guard line GL4 may minimize the influence of voltage variations in the fourth ground line GRL4 on the first through eighth driving lines TL1 through TL8. The fifth guard line GL5 may minimize the influence between the first sensing line RL1 and the sixteenth driving line TL1. The sixth guard line GL6 may minimize the influence between the twenty-first sensing line RL21 and the first driving line TL1.

To this end, when the first touch electrodes TE and the second touch electrodes RE are driven in a mutual capacitance manner, a ground voltage may be applied to the first, second, third, fourth, fifth, and sixth guard lines GL1, GL2, GL3, GL4, GL5, and GL6. On the other hand, when the first touch electrodes TE and the second touch electrodes RE are driven in a self-capacitance manner, the same driving signals as those applied to the first through sixteenth driving lines TL1 through TL16 and the first through thirty-third sensing lines RL1 through RL33 may be applied to the first, second, third, fourth, fifth, and sixth guard lines GL1, GL2, GL3, GL4, GL5, and GL6.

The ninth through sixteenth driving lines TL9 through TL16, the first through twentieth sensing lines RL1 through RL20, the first, third, and fifth guard lines GL1, GL3, and GL5, and the first and third ground lines GRL1 and GRL3 may be connected to the first touch pad portions TP1. The first through eighth driving lines TL1 through TL8, the twenty-first through thirty-third sensing lines RL21 through RL33, the second, fourth, and sixth guard lines GL2, GL4, and GL6, and the second and fourth ground lines GRL2 and GRL4 may be connected to the second touch pad portions TP2. FIG. 4 exemplarily shows only the display pads DP, and FIG. 5 exemplarily shows only the first touch pad portions TP1 and the second touch pad portions TP2. However, the display pads DP, the first touch pad portions TP1, and the second touch pad portions TP2 may all be disposed together at the end of the protruding area PA of the display panel 100, in which case, the display pads DP may be disposed between the first touch pad portions TP1 and the second touch pad portions TP2. For example, the first touch pad portions TP1 may be disposed on the left side of the array of the display pads DP, and the second touch pad portions TP2 may be disposed on the right side of the array of the display pads DP.

The ninth through sixteenth driving lines TL9 through TL16 may be disposed in the area where the first touch pad portions TP1 are disposed, and the first through eighth driving lines TL1 through TL8 may be disposed in the area where the second touch pad portions TP2 are disposed. As such, the uniformity of the arrangement of wiring can be improved, as well as providing an area to which the display pads DP are formed. Also, since the first through sixteenth driving lines TL1 through TL16 are connected only to the first touch electrodes TE at the lower end of the touch sensor area TSA that correspond to the first through sixteenth columns ER1 through ER16, i.e., the first through sixteenth driving lines TL1 through TL16 have a single routing structure, the size of the touch peripheral area TPA can be reduced.

Figure 6:
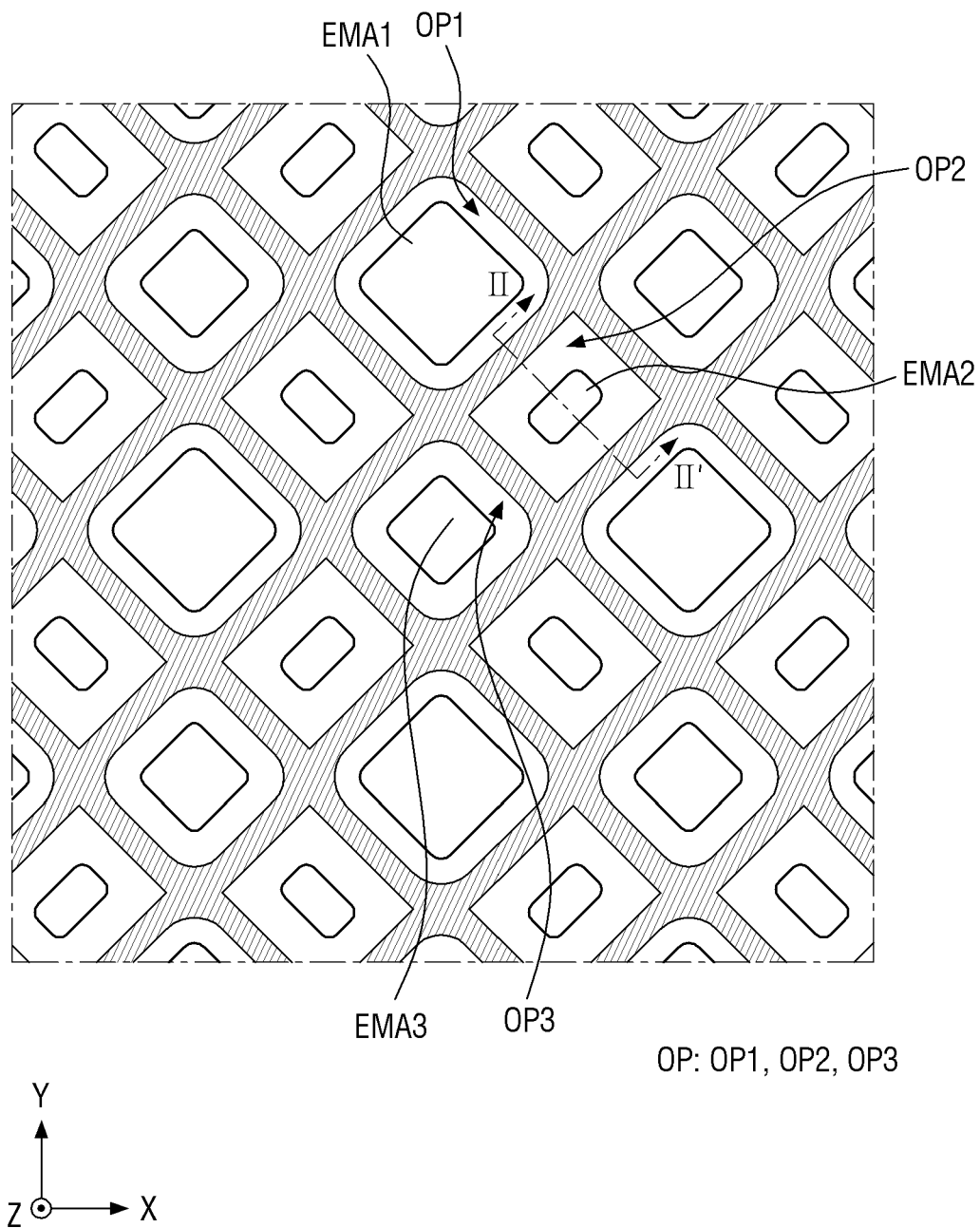
FIG. 6 is a plan view illustrating the shapes and the arrangement of light-emitting areas and first touch electrodes in an area A of FIG. 5 according to an exemplary embodiment.

FIG. 6 is a plan view illustrating the shapes and the arrangement of light-emitting areas and first touch electrodes in an area A of FIG. 5. Although FIG. 6 shows the shapes and the arrangement the light-emitting areas (EMA1, EMA2, and EMA3) and the first touch electrodes TE, according to an exemplary embodiment, the shapes and the arrangement of the light-emitting areas (EMA1, EMA2, and EMA3) and the second touch electrodes RE may be the same as those shown in FIG. 6.

Referring to FIG. 6, the first touch electrodes TE may include a plurality of openings OP. The openings OP may include first openings OP1, second openings OP2, and third openings OP3. The first openings OP1, the second openings OP2, and the third openings OP3 may have different sizes. For example, the third openings OP3 may have a smaller size than the first openings OP1, and the second openings OP2 may be smaller than the third openings OP3. However, the inventive concepts are not limited thereto. In some exemplary embodiments, the first openings OP1, the second openings OP2, and/or the third openings OP3 may have different sizes.

First light-emitting areas EMA1, second light-emitting areas EMA2, and third light-emitting areas EMA3 may have different sizes from each other. For example, the third light-emitting areas EMA3 may have a smaller size than the first light-emitting areas EMA1, and the second light-emitting areas EMA2 may have a smaller size than the third light-emitting areas EMA3. The first light-emitting areas EMA1, the second light-emitting areas EMA2, and the third light-emitting areas EMA3 may be defined by a pixel-defining film, which will be described later. Here, the light-emitting areas (EMA1, EMA2, and EMA3) may be defined as areas that release, to the outside of the display unit DU, light generated by light-emitting elements that will be described later with reference to FIG. 7.

In the display unit DU, the number of first light-emitting areas EMA1 may be the same as the number of third light-emitting areas EMA3. The number of second light-emitting areas EMA2 may be twice the number of first light-emitting areas EMA1 and twice the number of third light-emitting areas EMA3. Also, the number of second light-emitting areas EMA2 may be the same as the sum of the number of first light-emitting areas EMA1 and the number of third light-emitting areas EMA3.

The first light-emitting areas EMA1 may emit blue light, the second light-emitting areas EMA2 may emit green light, and the third light-emitting areas EMA3 may emit red light. However, the inventive concepts are not limited thereto. In some exemplary embodiments, fourth light-emitting areas may be further provided. In some exemplary embodiments, the first light-emitting areas EMA1, the second light-emitting areas EMA2, and the third light-emitting areas EMA3 may emit white light.

FIG. 6 illustrates that the light-emitting areas (EMA1, EMA2, and EMA3) have a rectangular shape with rounded corners, but the inventive concepts are not limited thereto. In some exemplary embodiments, the light-emitting areas (EMA1, EMA2, and EMA3) may have an octagonal shape, a circular shape, or another polygonal shape.

The first openings OP1, the second openings OP2, and the third openings OP3 correspond to the first light-emitting areas EMA1, the second light-emitting areas EMA2, and the third light-emitting areas EMA3, respectively. For example, the first openings OP1 of the first touch electrodes TE may overlap with the first light-emitting areas EMA1 of the display unit DU in a thickness direction, i.e., in the third direction (or the Z-axis direction), the second openings OP2 of the first touch electrodes TE may overlap with the second light-emitting areas EMA2 of the display unit DU in the thickness direction, i.e., in the third direction (or the Z-axis direction), and the third openings OP3 of the first touch electrodes TE may overlap with the third light-emitting areas EMA3 of the display unit DU in the thickness direction, i.e., in the third direction (or the Z-axis direction). Since the first openings OP1, the second openings OP2, and the third openings OP3 overlap with the first light-emitting areas EMA1, the second light-emitting areas EMA2, and the third light-emitting areas EMA3, respectively, in the third direction (or the Z-axis direction), light output from the display unit DU can effectively pass through the touch sensing unit TDU to be released to the outside of the display device 10. Accordingly, light loss can be minimized. Also, since the overlapping areas of the first touch electrodes TE and a second electrode 173 of FIG. 7 can be reduced, the parasitic capacitance between the first touch electrodes TE and the second electrode 173 can be reduced. The second touch electrodes RE according to an exemplary embodiment may be formed in substantially the same manner as the first touch electrodes TE, and thus, detailed descriptions of the second touch electrodes RE will be omitted to avoid redundancy.

Figure 7:
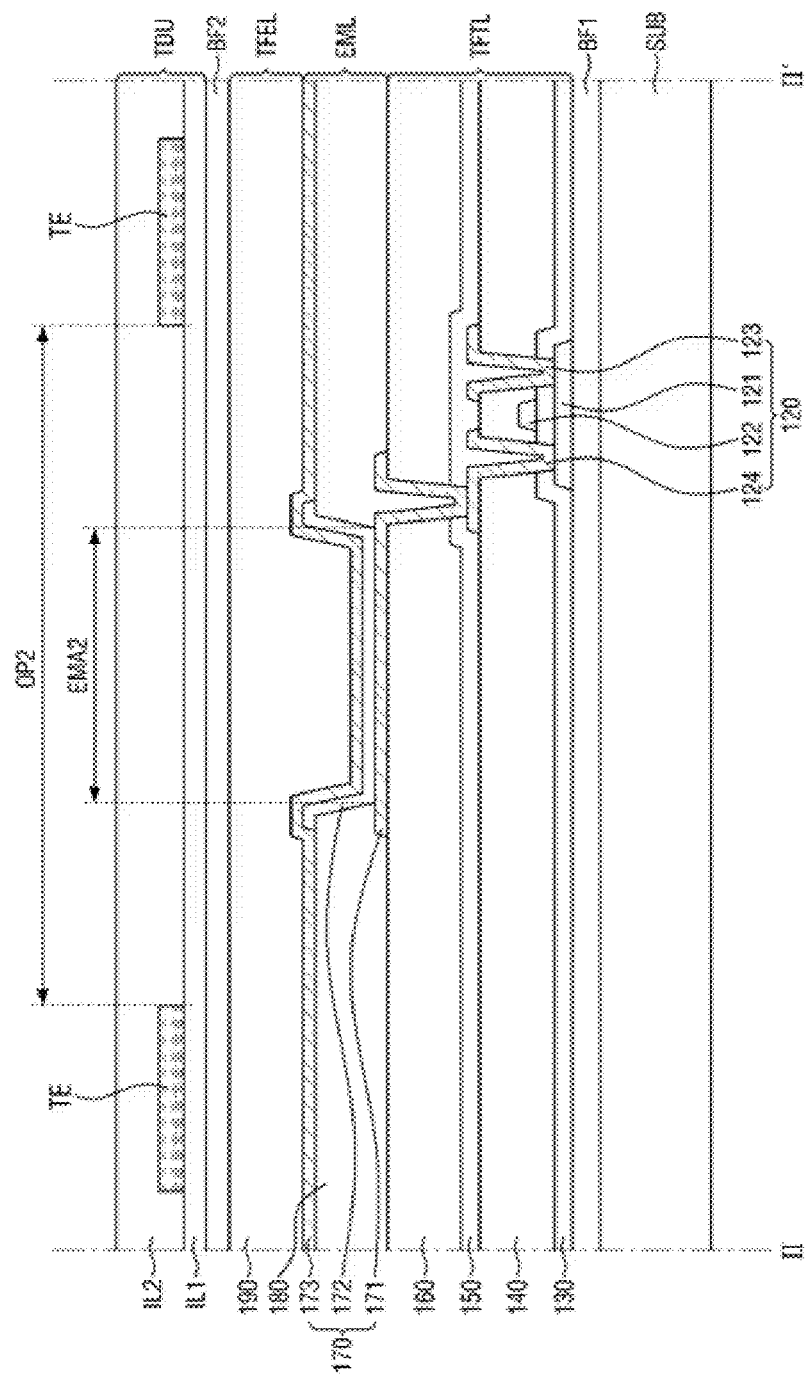
FIG. 7 is a cross-sectional view taken along line II-IF of FIG. 6.

FIG. 7 is a cross-sectional view taken along line II-IF of FIG. 6. FIG. 7 exemplarily shows a region where a second light-emitting area EMA2 and a second opening OP2 are formed, however, regions where a first light-emitting area EMA1 and a first opening OP1 are formed and where a third light-emitting area EMA3 and a third opening OP3 are formed may have substantially the same structure as shown in FIG. 7 except different sizes thereof.

Referring to FIGS. 6 and 7, the TFT layer TFTL is formed on the substrate SUB. The TFT layer TFTL includes TFTs 120, a gate insulating film 130, an interlayer insulating film 140, a passivation film 150, and a planarization film 160.

A first buffer layer BF1 may be formed on the substrate SUB. The first buffer layer BF1 may be formed on the substrate SUB to protect the TFTs 120 and an organic light-emitting layer 172 of the light-emitting element layer EML against moisture that may penetrate through the substrate SUB. The first buffer layer BF1 may include a plurality of inorganic films that are alternately stacked. For example, the first buffer layer BF1 may be formed as a multilayer film, in which at least one of a silicon nitride layer, a silicon oxynitride layer, a silicon oxide layer, a titanium oxide layer, and an aluminum oxide layer is alternately stacked. In some exemplary embodiments, the first buffer layer BF1 may be omitted.

Figure 9:
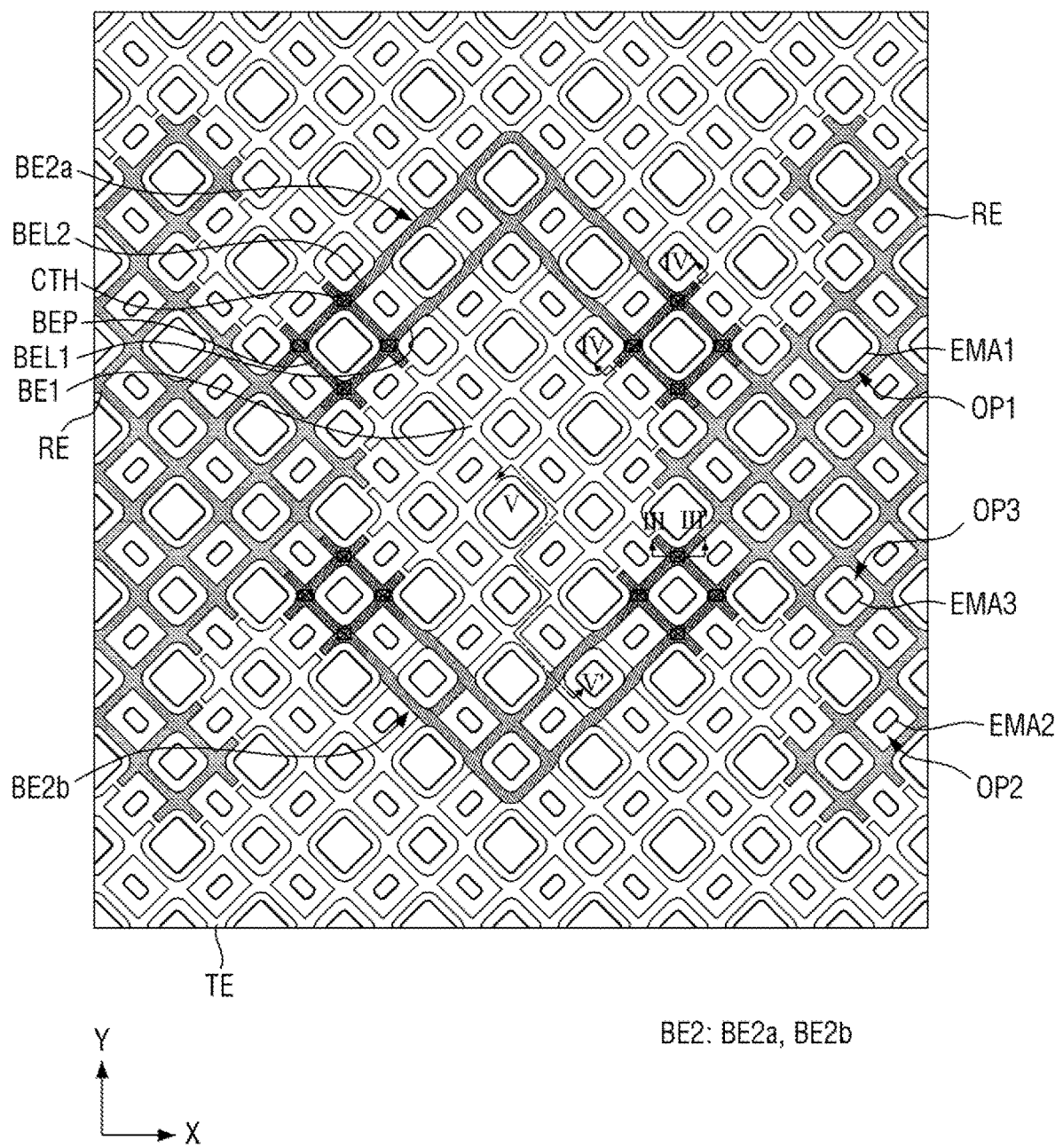
FIG. 9 is an exemplary enlarged layout view of an area B_1 of FIG. 8.

The TFTs 120 may be formed on the first buffer layer BF1. Each of the TFTs 120 includes an active layer 121, a gate electrode 122, a source electrode 123, and a drain electrode 124. FIG. 9 illustrates that the TFTs 120 have a top gate structure, in which the gate electrode 122 is disposed above the active layer 121, but the inventive concepts are not limited thereto. For example, in some exemplary embodiments, the TFTs 120 may have a bottom gate structure, in which the gate electrode 122 is disposed below the active layer 121 or a double gate structure, in which the gate electrode 122 is disposed both above and below the active layer 121.

The active layer 121 is formed on the first buffer layer BF1. The active layer 121 may include polycrystalline silicon, monocrystalline silicon, low-temperature polycrystalline silicon, amorphous silicon, or an oxide semiconductor. For example, the oxide semiconductor may be a binary compound (ABx), a ternary compound (ABxCy), or a quaternary compound (ABxCyDz) including indium (In), zinc (Zn), gallium (Ga), tin (Sb), titanium (Ti), aluminum (Al), hafnium (Hf), zirconium (Zr), or magnesium (Mg). For example, the active layer 121 may include indium tin zinc oxide (ITZO) or indium gallium zinc oxide (IGZO). In some exemplary embodiments, a light-shielding layer for blocking external light incident upon the active layer 121 may be formed between the first buffer layer BF1 and the active layer 121.

The gate insulating film 130 may be formed on the active layer 121. The gate insulating film 130 may include an inorganic film, such as, for example, a silicon nitride layer, a silicon oxynitride layer, a silicon oxide layer, a titanium oxide layer, or an aluminum oxide layer.

The gate electrode 122 and a gate line may be formed on the gate insulating film 130. The gate electrode 122 and the gate line may be formed as single- or multilayer films using molybdenum (Mo), Al, chromium (Cr), gold (Au), Ti, nickel (Ni), neodymium (Nd), copper (Cu), or an alloy thereof.

The interlayer insulating film 140 may be formed on the gate electrode 122 and the gate line. The interlayer insulating film 140 may include an inorganic film, such as, for example, a silicon nitride layer, a silicon oxynitride layer, a silicon oxide layer, a titanium oxide layer, or an aluminum oxide layer.

The source electrode 123 and the drain electrode 124 may be formed on the interlayer insulating film 140. The source electrode 123 and the drain electrode 124 may be connected to the active layer 121 through insulating film contact holes that penetrate the gate insulating film 130 and the interlayer insulating film 140. The source electrode 123 and the drain electrode 124 may be formed as single- or multilayer films using Mo, Al, Cr, Au, Ti, Ni, Nd, Cu, or an alloy thereof.

The passivation film 150 insulating the TFTs 120 may be formed on the source electrode 123 and the drain electrode 124. The passivation film 150 may include an inorganic film, such as, for example, a silicon nitride layer, a silicon oxynitride layer, a silicon oxide layer, a titanium oxide layer, or an aluminum oxide layer.

The planarization film 160, which planarizes height differences generated by the TFTs 120, may be formed on the passivation film 150. The planarization film 160 may include an organic film using an acrylic resin, an epoxy resin, a phenolic resin, a PA resin, or a PI resin.

The light-emitting element layer EML is formed on the TFT layer TFTL. The light-emitting element layer EML includes light-emitting elements 170 and a pixel-defining film 180.

The light-emitting elements 170 and the pixel-defining film 180 are formed on the planarization film 160. Each of the light-emitting elements 170 may include a first electrode 171, the organic light-emitting layer 172, and the second electrode 173.

The first electrode 171 may be formed on the planarization film 160. The first electrode 171 may be connected to the source electrode 123 of each of the TFTs 120 through a contact hole that penetrates the passivation film 150 and the planarization film 160.

When the light-emitting element layer EML is formed as a top emission-type light-emitting element layer that emits light in a direction toward the second electrode 173 with respect to the organic light-emitting layer 172, the first electrode 171 may include metal having high reflectance, such as a stack of Al and Ti (e.g., Ti/Al/Ti), a stack of Al and ITO (e.g., ITO/Al/ITO), a silver (Ag)-palladium (Pd)-copper (Cu) (APC) alloy, or a stack of an APC alloy and ITO (e.g., ITO/APC/ITO).

When the light-emitting element layer EML is formed as a bottom emission-type light-emitting element layer that emits light in a direction toward the first electrode 171 with respect to the organic light-emitting layer 172, the first electrode 171 may be formed of a transparent conductive oxide (TCO) material, such as ITO or IZO, or a semi-transmissive conductive material, such as Mg, Ag, or an alloy thereof. When the first electrode 171 is formed of a semi-transmissive conductive material, emission efficiency can be improved due to micro-cavities.

The pixel-defining film 180 may be formed on the planarization film 160 to define the first electrode 171, and thus, defining subpixels (RP, GP, and BP). For example, the pixel-defining film 180 may be formed to cover the edges of the first electrode 171. The pixel-defining film 180 may be formed as an organic film using an acrylic resin, an epoxy resin, a phenolic resin, a PA resin, or a PI resin.

Each of the second light-emitting areas EMA2 may refer to a region in which the first electrode 171, the organic light-emitting layer 172, and the second electrode 173 are sequentially stacked, and holes from the first electrode 171 and electrons from the second electrode 173 are combined together in the organic light-emitting layer 172 to emit light. The light-emitting areas (EMA1, EMA2, and EMA3) may include the light-emitting elements 170.

The organic light-emitting layer 172 is formed on the first electrode 171 and on the pixel-defining film 180. The organic light-emitting layer 172 may include an organic material and may emit light of a predetermined color. For example, the organic light-emitting layer 172 may include a hole transport layer, an organic material layer, and an electron transport layer.

The second electrode 173 is formed on the organic light-emitting layer 172. The second electrode 173 may be formed to cover the organic light-emitting layer 172. The second electrode 173 may be a common layer formed in common for all the light-emitting areas (EMA1, EMA2, and EMA3). In some exemplary embodiments, a capping layer may be formed on the second electrode 173.

In a top emission structure, the second electrode 173 may be formed of a TCO material, such as ITO or IZO, or a semi-transmissive conductive material, such as Mg, Ag, or an alloy thereof. When the second electrode 173 is formed of a semi-transmissive conductive material, emission efficiency can be improved due to micro-cavities.

In a bottom emission structure, the second electrode 173 may include metal having high reflectance, such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO).

The thin-film encapsulation layer TFEL is formed on the light-emitting element layer EML. The thin-film encapsulation layer TFEL includes an encapsulation film 190.

The encapsulation film 190 is disposed on the second electrode 173. The encapsulation film 190 may include at least one inorganic film to prevent oxygen or moisture from infiltrating into the organic light-emitting layer 172 and the second electrode 173. Also, the encapsulation film 190 may include at least one organic film to protect the light-emitting element layer EML against foreign materials, such as dusts. For example, the encapsulation film 190 may include a first inorganic film disposed on the second electrode 173, an organic film disposed on the first inorganic film, and a second inorganic film disposed on the organic film. The first and second inorganic films may be formed as silicon nitride layers, silicon oxynitride layers, silicon oxide layers, titanium oxide layers, or aluminum oxide layers, without being limited thereto. The organic film may be formed of an acrylic resin, an epoxy resin, a phenolic resin, a PA resin, or a polyimide resin, without being limited thereto.

A second buffer layer BF2 is formed on the thin-film encapsulation layer TFEL. The second buffer layer BF2 may include a plurality of inorganic films that are alternately stacked. For example, the second buffer layer BF2 may be formed as a multilayer film, in which at least one of a silicon nitride layer, a silicon oxynitride layer, a silicon oxide layer, a titanium oxide layer, and an aluminum oxide layer is alternately stacked. In some exemplary embodiments, the second buffer layer BF2 may be omitted.

The touch sensing unit TDU is disposed on the second buffer layer BF2. As illustrated in FIG. 5, the touch sensing unit TDU may include the first touch electrodes TE, the second touch electrodes RE, the first connecting electrodes BE1, the second connecting electrodes BE2, the first through sixteenth driving lines TL1 through TL16, the first through thirty-third sensing lines RL1 through RL33, the first through sixth guard lines GL1 through GL6, and the first through fourth ground lines GRL1 through GRL4. FIG. 7 exemplarily illustrates only the first touch electrodes TE of the touch sensing unit TDU.

First and second insulating layers IL1 and IL2 are disposed on the second buffer layer BF2.

The first insulating layer IL1 may include an inorganic material. For example, the first insulating layer IL1 may include a silicon nitride layer, a silicon oxynitride layer, a silicon oxide layer, a titanium oxide layer, or an aluminum oxide layer.

The second insulating layer IL2 may include an organic material. For example, the second insulating layer IL2 may include at least one of an acrylic resin, a methacrylic resin, polyisoprene, a vinyl resin, an epoxy resin, a urethane resin, a cellulose resin, a siloxane resin, a PI resin, a PA resin, and a perylene resin.

The second connecting electrodes BE2 may be disposed between the first insulating layer IL1 and the second buffer layer BF2. The first touch electrodes TE, the second touch electrodes RE, and the first connecting electrodes BE1 may be disposed between the first and second insulating layers IL1 and IL2. Also, the first through sixteenth driving lines TL1 through TL16, the first through thirty-third sensing lines RL1 through RL33, the first through sixth guard lines GL1 through GL6, and the first through fourth ground lines GRL1 through GR4 may be disposed between the first and second insulating layers IL1 and IL2. The arrangement of the first touch electrodes TE, the second touch electrodes RE, the first connecting electrodes BE1, and the second connecting electrodes BE2 will be described later.

According to an exemplary embodiment, the first touch electrodes TE, the second touch electrodes RE, the first connecting electrodes BE1, the second connecting electrodes BE2, the first through sixteenth driving lines TL1 through TL16, the first through thirty-third sensing lines RL1 through 8133, the first through sixth guard lines GL1 through GL6, and the first through fourth ground lines GRL1 through GR4 may include a conductive material. For example, the conductive material may include metal or an alloy thereof. The metal may include Au, Ag, Al, Mo, Cr, Ti, Ni, Nd, Cu, or platinum (Pt). According to another exemplary embodiment, the first touch electrodes TE, the second touch electrodes RE, the first connecting electrodes BE1, the second connecting electrodes BE2, the first through sixteenth driving lines TL1 through TL16, the first through thirty-third sensing lines RL1 through 8133, the first through sixth guard lines GL1 through GL6, and the first through fourth ground lines GRL1 through GR4 may be formed of a transparent conductive material. The transparent conductive material may be silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube (CNT), or graphene.

In some exemplary embodiments, the first touch electrodes TE, the second touch electrodes RE, the first connecting electrodes BE1, the second connecting electrodes BE2, the first through sixteenth driving lines TL1 through TL16, the first through thirty-third sensing lines RL1 through 8133, the first through sixth guard lines GL1 through GL6, and the first through fourth ground lines GRL1 through GR4 may have a single- or multilayer structure. When the first touch electrodes TE, the second touch electrodes RE, the first connecting electrodes BE1, the second connecting electrodes BE2, the first through sixteenth driving lines TL1 through TL16, the first through thirty-third sensing lines RL1 through 8133, the first through sixth guard lines GL1 through GL6, and the first through fourth ground lines GRL1 through GR4 have a multilayer structure, the first touch electrodes TE may include multiple metal layers. For example, the first touch electrodes TE may have a triple-layer structure of Ti/Al/Ti.

Figure 8:
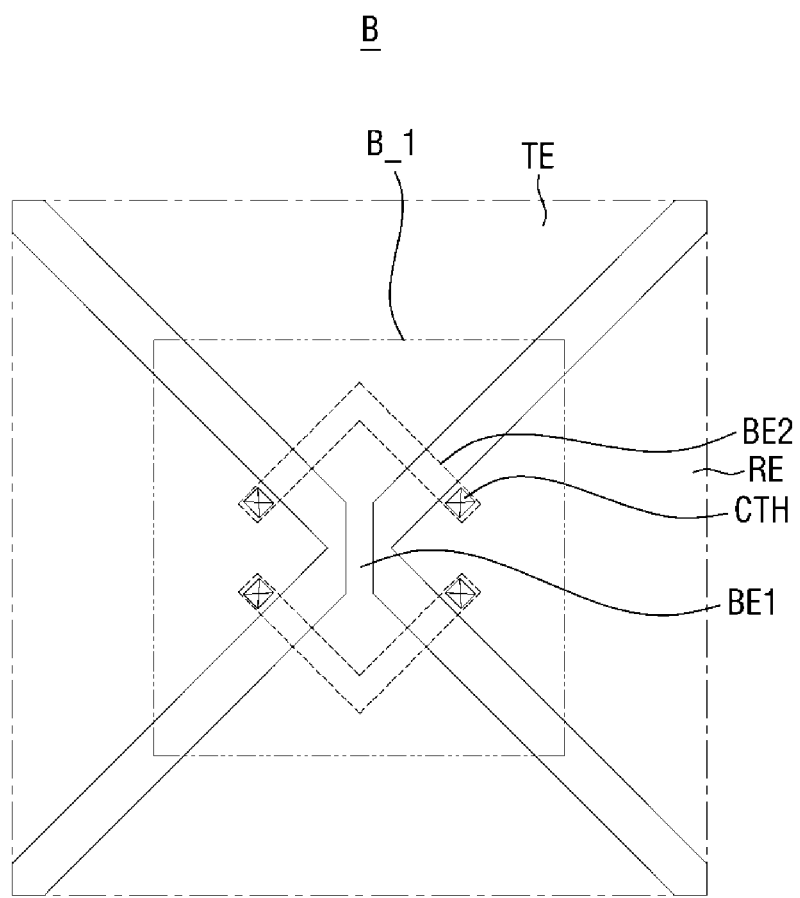
FIG. 8 is an enlarged layout view of an area B of FIG. 5.
Figure 10:
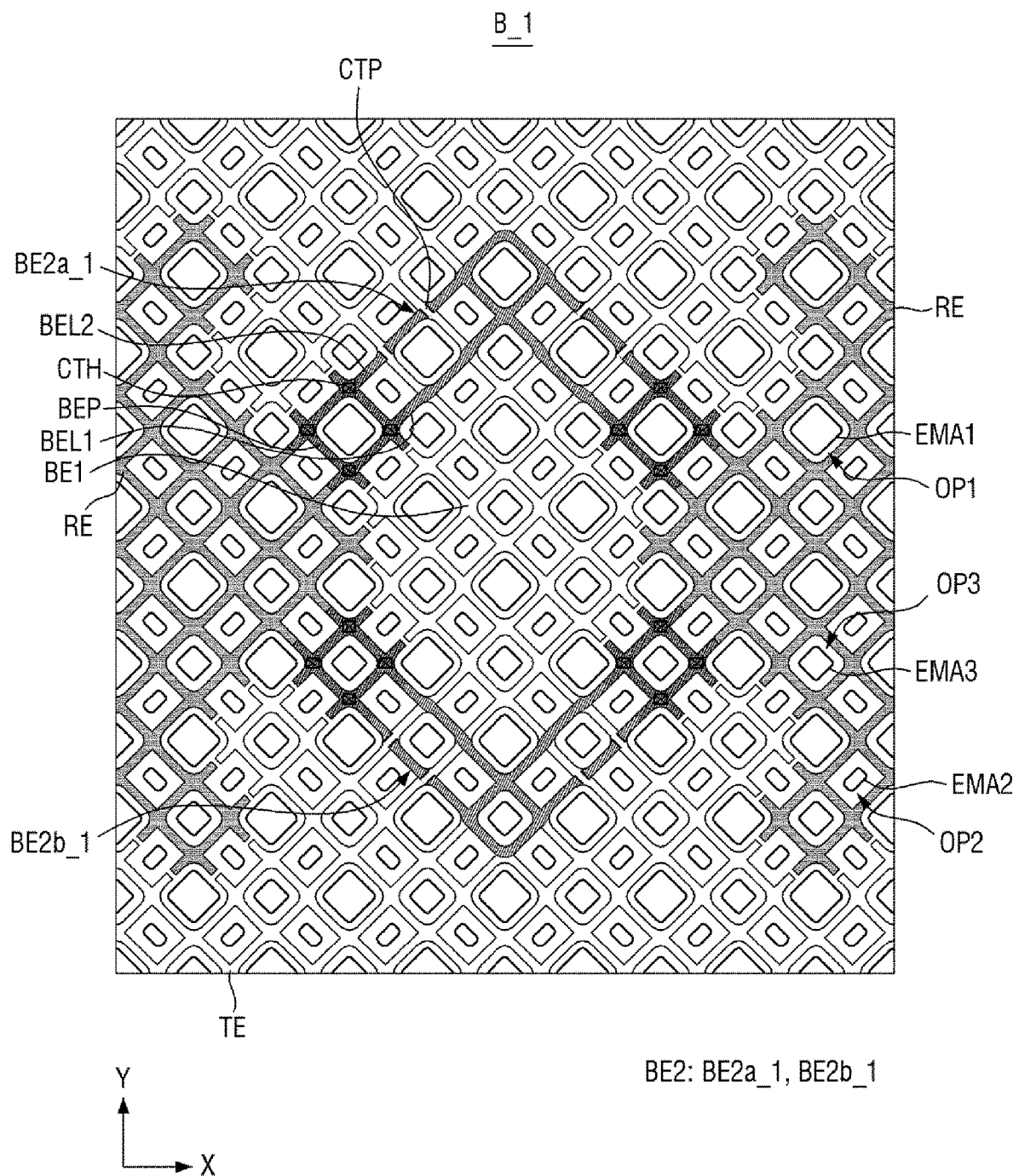
FIG. 10 is another exemplary enlarged layout view of the area B_1 of FIG. 8.

FIG. 8 is an enlarged layout view of an area B of FIG. 5, FIG. 9 is an exemplary enlarged layout view of an area B_1 of FIG. 8, and FIG. 10 is another exemplary enlarged layout view of the area B_1 of FIG. 8.

Referring to FIG. 8, the first touch electrodes TE may be spaced apart from one another in the second direction (or the Y-axis direction), and pairs of adjacent first touch electrodes TE in the second direction (or the Y-axis direction) may be electrically connected via the first connecting electrodes BE1. The first connecting electrodes BE1 may be disposed on the same layer as the first touch electrodes TE, and may be formed during the formation of the first touch electrodes TE. In an exemplary embodiment, the first touch electrodes TE and the first connecting electrodes BE1 may be integrally formed.

The second touch electrodes RE may be spaced apart from one another in the first direction (or the X-axis direction), and pairs of adjacent second touch electrodes RE in the first direction (or the X-axis direction) may be electrically connected via the second connecting electrodes BE2. The second connecting electrodes BE2 may be disposed on a different layer from the second touch electrodes RE, and may be in contact with the second touch electrodes TE through contact holes CTH. The second connecting electrodes BE2 may be bent at least once and have the shape of the symbol "<" or ">" in a plan view, however, the inventive concepts are not limited to a particular planar shape of the second connecting electrodes BE2. The second connecting electrodes BE2 may overlap with the first touch electrodes TE and the second touch electrodes RE in the thickness direction, i.e., the third direction (or the Z-axis direction). The contact holes CTH are disposed in regions where the second connecting electrodes BE2 and the second touch electrodes RE overlap each other, and the pairs of adjacent second touch electrodes RE in the first direction (or the Z-axis direction) are in contact with the second connecting electrodes BE2 through the contact holes CTH and are electrically connected via the second connecting electrodes BE2.

Referring to FIG. 9, according to an exemplary embodiment, the second connecting electrodes BE2 may include first connecting portions BE2a, which are bent in the second direction (or the Y-axis direction), and second connecting portions BE2b, which are bent in the opposite direction of the second direction (or the opposite direction of the Y-axis direction). The first connecting portions BE2a and the second connecting portions BE2b are electrically connected to the pairs of adjacent second touch electrodes RE. However, the inventive concepts are not limited thereto. In some exemplary embodiments, the second connecting electrodes RE may include only the first connecting portions BE2a or the second connecting portions BE2b, or may further include additional connecting portions in addition to the first connecting portions BE2a and the second connecting portions BE2b.

Parts of the first connecting portions BE2a, which are bent in the second direction (or the Y-axis direction), may overlap with first touch electrodes TE disposed above the first connecting portions BE2a in the third direction (or the Z-axis direction), and parts of the second connecting portions BE2b, which are bent in the opposite direction of the second direction (or the opposite direction of the Y-axis direction), may overlap with first touch electrodes TE disposed below the second connecting portions BE2b in the third direction (or the Z-axis direction). However, the inventive concepts are not limited thereto. In some exemplary embodiments, the first connecting portions BE2a and the second connecting portions BE2b may be formed as bars extending in the first direction (or the X-axis direction), in which case, the first connecting portions BE2a and the second connecting portions BE2b may not overlap with the first touch electrodes TE in the third direction (or the Z-axis direction). In another exemplary embodiment, the first connecting portions BE2a and the second connecting portions BE2b may have different shapes. For example, the first connecting portions BE2a may be bent in the second direction (or the Y-axis direction), and the second connecting portions BE2b may be formed as bars extending in the first direction (or the X-axis direction). In this case, parts of the first connecting portions BE2a may overlap with the first touch electrodes TE disposed above the first connecting portions BE2a in the third direction (or the Z-axis direction), but not with the first touch electrodes TE disposed below the second connecting portions BE2b in the third direction (or the Z-axis direction), and may overlap with the first connecting electrodes BE1 in the third direction (or the Z-axis direction).

Each of the first connecting portions BE2a may include a first connecting line BEL1, a second connecting line BEL2, and a connecting pattern BEP. Each of the second connecting portions BE2b may also include a first connecting line BEL1, a second connecting line BEL2, and a connecting pattern BEP.

Specifically, each of the first connecting portions BE2a may include first and second connecting lines BEL1 and BEL2, which are bent in the second direction (or the Y-axis direction) at centers thereof. The first and second connecting lines BEL1 and BEL2 may be spaced apart from each other in the second direction (or the Y-axis direction), contact holes CTH may be disposed on both sides of each of the first and second connecting lines BEL1 and BEL2, and both ends of each of the first and second connecting lines BEL1 and BEL2 may be in contact with different second touch electrodes RE through the contact holes CTH. The connecting pattern BEP may electrically connect the first and second connecting lines BEL1 and BEL2, which are spaced apart from each other. Multiple connecting patterns BEP may be provided. However, the inventive concepts are not limited thereto, and in some exemplary embodiments, the first connecting portions BE2a and the second connecting portions BE2b may be implemented as single connecting lines.

Referring to FIG. 10, according to another exemplary embodiment, each first connecting portion BE2a_1 may include a first connecting line BEL1, a second connecting line BEL2, and a connecting pattern BEP, and each second connecting portion BE2b_1 may include a first connecting line BEL1, a second connecting line BEL2, and a connecting pattern BEP. According to the illustrated exemplary embodiment, the second connecting line BEL2 may further include a disconnected portion CTH, in which case, a pair of adjacent second touch electrodes RE may be connected only via the first connecting line BEL1.

Figure 11:
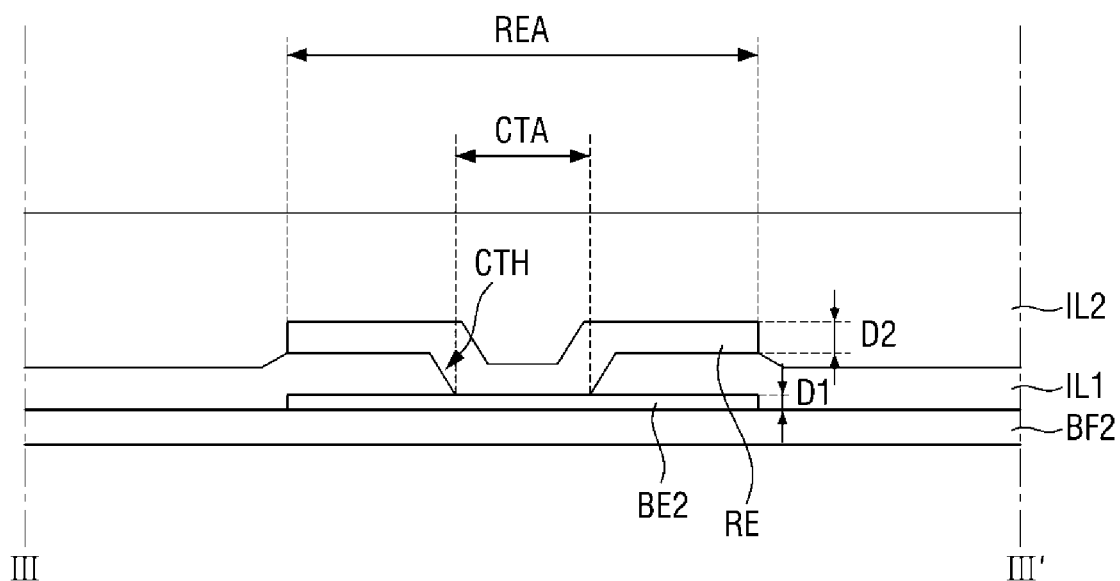
FIG. 11 is a cross-sectional view taken along line of FIG. 9.
Figure 12:
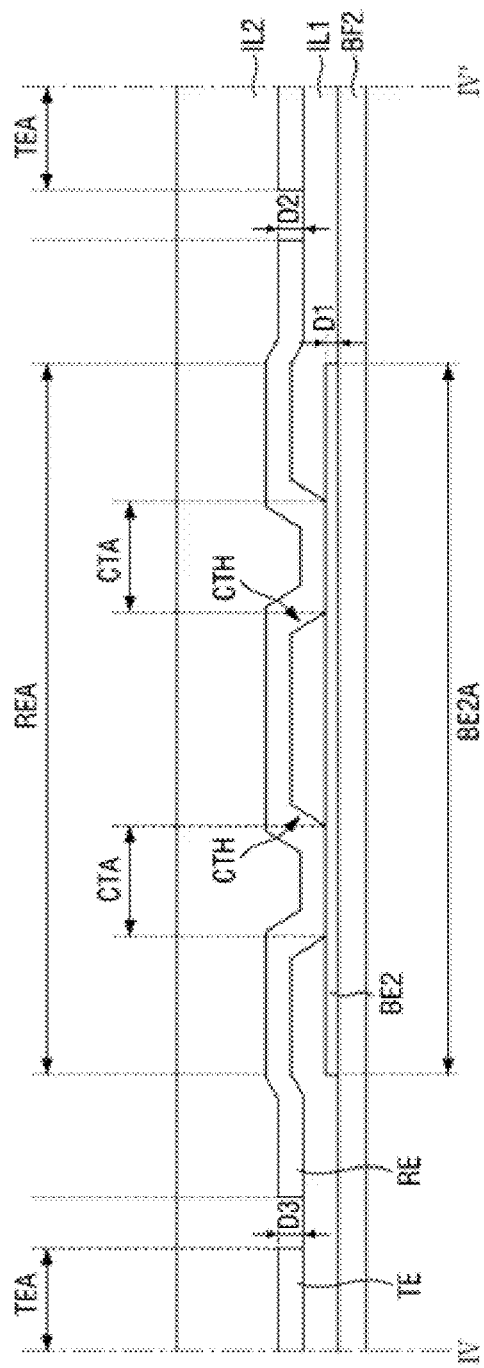
FIG. 12 is a cross-sectional view taken along line IV-IV' of FIG. 9.
Figure 13:
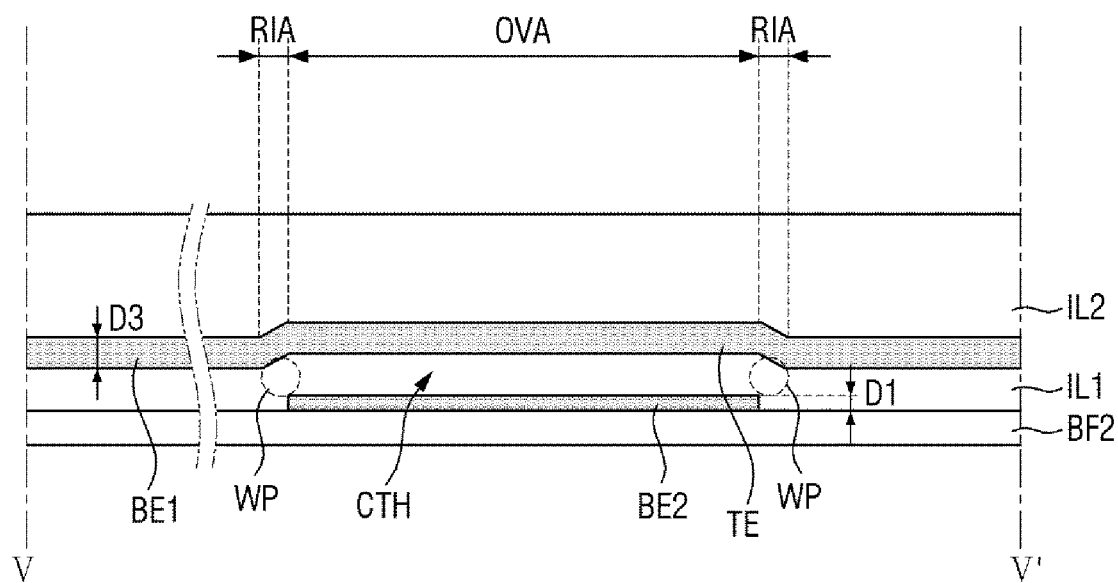
FIG. 13 is a cross-sectional view taken along line V-V' of FIG. 9.

FIG. 11 is a cross-sectional view taken along line of FIG. 9, FIG. 12 is a cross-sectional view taken along line IV-IV' of FIG. 9, and FIG. 13 is a cross-sectional view taken along line V-V' of FIG. 9. The elements of the touch sensing unit TDU have already been described above with reference to FIGS. 5 through 10, and thus, the lamination structure of the elements of the touch sensing unit TDU will hereinafter be described with reference to FIGS. 11 through 13.

Referring to FIGS. 11 through 13, the touch sensing unit TDU may include contact areas CTA where the second touch electrodes RE are in contact with the second connecting electrodes BE2, first touch electrode areas TEA where the first touch electrodes TE are disposed, and second touch electrode areas REA where the second touch electrodes RE are disposed.

The second connecting electrodes BE2 may be disposed on the second buffer layer BF2, and the first insulating layer IL1 may be disposed on the second connecting electrodes BE2. The first insulating layer IL1 may include the contact holes CTH, which expose parts of the second connecting electrodes BE2.

The first touch electrodes TE, the second touch electrodes RE, and the first connecting electrodes BE1 may be disposed on the first insulating layer IL1, and the second touch electrodes RE may be in contact with the second connecting electrodes BE2 through the contact holes CTH, which are disposed in the first insulating layer IL1.

The second insulating layer IL2 may be disposed on the first insulating layer the first touch electrodes TE, the second touch electrodes RE, and the first connecting electrodes BE1.

The second connecting electrodes BE2, which are disposed on the first insulating layer IL1, may have a first thickness D1, and the second touch electrodes RE, which are disposed on the second insulating layer IL2 and are electrically connected to the second connecting electrodes BE through the contact holes CTH, may have a second thickness D2. The first and second thicknesses D1 and D2 may be different from each other. For example, the first thickness D1 may be less than the second thickness D2. More particularly, according to an exemplary embodiment, the first thickness D1 may be in a range of about 500 Å to about 2300 Å, and the second thickness D2 may be in a range of about 2300 Å to about 4000 Å, without being limited thereto.

The first touch electrodes TE and the first connecting electrodes BE1, which are disposed on the second insulating layer IL2, may have a third thickness D3. The third thickness D3 may be greater than the first thickness D1. Alternatively, in some exemplary embodiments, the third thickness D3 may be the same as the second thickness D2. For example, the first touch electrodes TE, the second touch electrodes RE, and the first connecting electrodes BE1 may be formed by the same process, and thus, the second and third thicknesses D2 and D3 may be substantially the same, but the inventive concepts are not limited thereto. In some exemplary embodiments, the first touch electrodes TE, the second touch electrodes RE, and the first connecting electrodes BE1 may be formed by different processes, and in this case, the second and third thicknesses D2 and D3 may be different from each other.

Since the first insulating layer IL1 includes an inorganic material, the first insulating layer IL1 has a height difference in areas where the second connecting electrodes BE2 are disposed. Thus, if the first touch electrodes TE are disposed on the first insulating layer IL1 having a height difference, the first touch electrodes TE have stepped areas RIA and overlapping areas OVA, in which the first touch electrodes TE overlap with the second connecting electrodes BE2 in the thickness direction BE2. In this case, short circuits may be caused in weak parts WP, which are defined as regions between the stepped areas RIA and the edges of the second connecting electrode BE2, and as a result, defects may occur in the touch sensing unit TDU. According to an exemplary embodiment, by reducing the thickness of the second connecting electrodes BE2, i.e., the first thickness D1, as shown in FIG. 13, the height difference in the first insulating layer IL1 can be alleviated, and as a result, the weak parts WP can be reinforced. In this manner, the second connecting electrodes BE2 and the first touch electrodes TE can be prevented in advance or be suppressed from being short-circuited in the weak parts WP.

Figure 14:
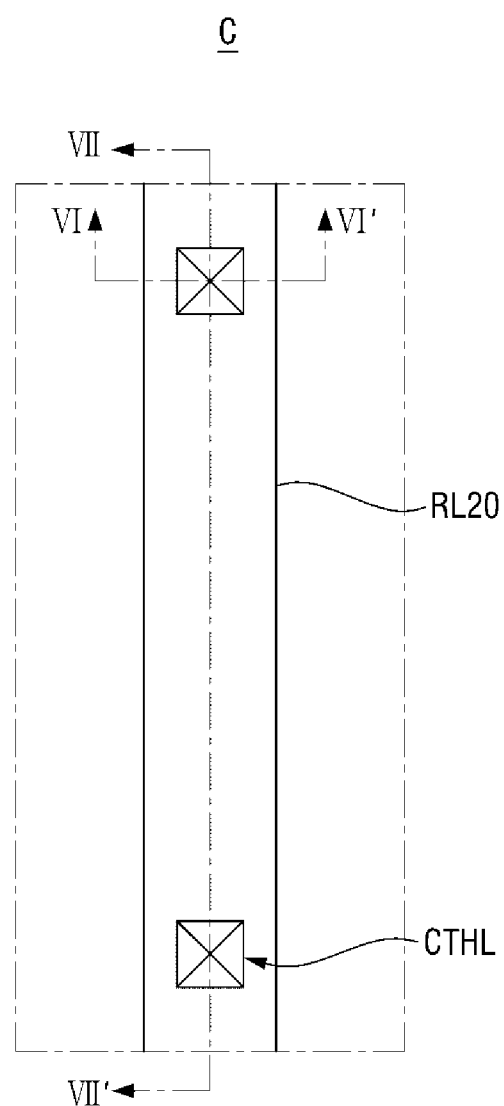
FIG. 14 is a cross-sectional view of an area C of FIG. 5.
Figure 15:
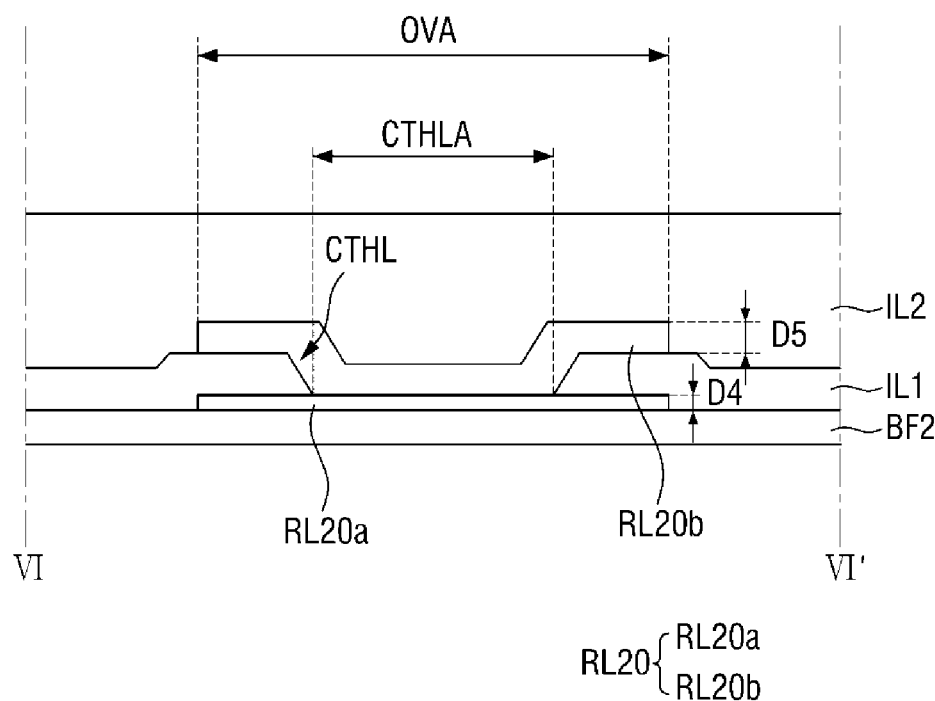
FIG. 15 is a cross-sectional view taken along line VI-VI' of FIG. 14.
Figure 16:
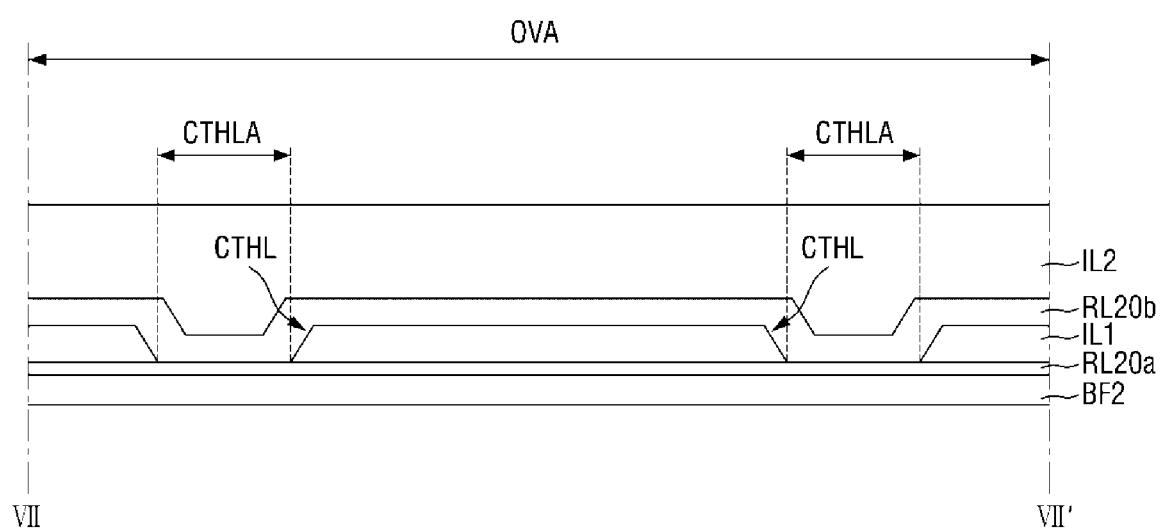
FIG. 16 is a cross-sectional view taken along line VII-VII' of FIG. 14.

FIG. 14 is a cross-sectional view of an area C of FIG. 5, FIG. 15 is a cross-sectional view taken along line VI-VI' of FIG. 14, and FIG. 16 is a cross-sectional view taken along line VII-VII' of FIG. 14. FIGS. 14 through 16 exemplarily illustrate the structure of the first through sixteenth driving lines TL1 through TL16 and the first through thirty-third sensing lines RL1 through RL33. The structure of the first through sixteenth driving lines TL1 through TL16 and the first through thirty-third sensing lines RL1 through RL33 will hereinafter be described with reference to the twentieth sensing line RL20 shown in FIGS. 14 through 16. It is noted that the first through sixteenth driving lines TL1 through TL16, the first through nineteenth sensing lines RL1 through RL19, and the twenty-first through thirty-third sensing lines RL21 through RL33 may have the same structure as the twentieth sensing line RL20.

Referring to FIGS. 14 through 16, the twentieth sensing line RL20 may include a 20a-th sensing line RL20a and a 20b-th sensing line RL20b.

The 20a-th sensing line RL20a may have a fourth thickness D4, which is substantially the same as the first thickness D1, and may be disposed on the second buffer layer BF2. The first insulating layer IL1 may include wire contact holes CTRL, which expose parts of the second connecting electrodes BE2.

The 20b-th sensing line RL20b, which has a fifth thickness D5 that is substantially the same as the second and third thicknesses D2 and D3, may be disposed on the first insulating layer ILL and may be in contact with the 20a-th sensing line RL20a through the wire contact holes CTRL, which are disposed in the first insulating layer IL1. The second insulating layer IL2 may be disposed on the first insulating layer IL1 and the 20b-th sensing line RL20b.

The twentieth sensing line RL20 may include a wire contact area CTHLA, in which the 20a- and 20b-th sensing lines RL20a and RL20b are in contact with each other, and an overlapping area OVA, in which the 20a- and 20b-th sensing lines RL20a and RL20b overlap with each other in the thickness direction, and the wire contact area CTHLA may be included in the overlapping area OVA.

According to an exemplary embodiment, each of the 20a- and 20b-th sensing lines RL20a and RL20b may have a mesh structure. Since the twentieth sensing line RL20 includes the 20a- and 20b-th sensing lines RL20a and RL20b, which overlap with each other in the thickness direction with the first insulating layer IL1 interposed therebetween and are electrically connected via the wire contact holes CTRL, the resistance of the twentieth sensing line RL20 can be reduced due to the resistances of the 20a- and 20b-th sensing lines RL20a and RL20b being connected in parallel. Accordingly, the touch sensitivity of the touch sensing unit TDU can be improved.

Figure 17:
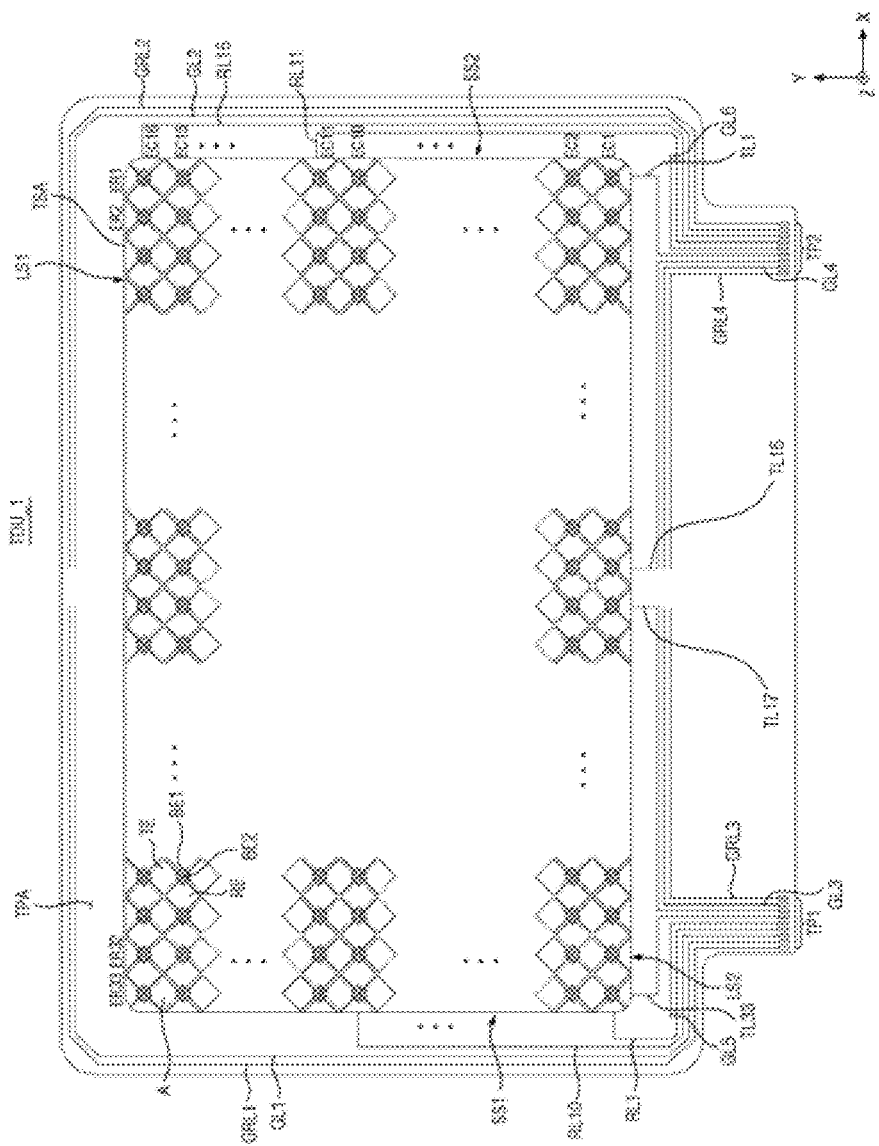
FIG. 17 is a layout view of a touch sensing unit according to another exemplary embodiment.

FIG. 17 is a layout view of a touch sensing unit according to another exemplary embodiment. The touch sensing unit of FIG. 17 differs from that shown in FIG. 5, in that a touch sensing unit TDU_1 according to the illustrated exemplary embodiment has a major axis in the first direction (or the X-axis direction) and a minor axis in the second direction (or the Y-axis direction), and that first touch electrodes TE are connected, through contact holes CTH, to first connecting electrodes BE1, which are arranged in the first direction (or the X-axis direction). The touch sensing unit TDU_1 of FIG. 17 will hereinafter be described, focusing mainly on the differences with the touch sensing unit TDU of FIG. 5.

Referring to FIG. 17, a touch sensor area TSA of the touch sensing unit TDU_1 may include first and second long sides LS1 and LS2 which extend in the first direction (or the X-axis direction) and are opposite to each other in the second direction (or the Y-axis direction), and first and second short sides SS1 and SS2 which extend in the second direction (or the Y-axis direction) and are opposite to each other in the first direction (or the X-axis direction).

In the touch sensor area TSA, 33 first touch electrodes TE may be arranged in the first direction (or the X-axis direction), and 16 second touch electrodes RE may be arranged in the second direction (or the Y-axis direction). More particularly, touch electrodes (TE and RE) may be arranged in 16 rows (EC1 through EC16) and 33 columns (ER1 through ER33), the first touch electrode TE may be arranged in the 33 columns (ER1 through ER33), and the second touch electrodes RE may be arranged in the 16 rows (EC1 through EC16). However, the inventive concepts are not limited thereto, and the numbers and the arrangement of first touch electrodes TE and second touch electrodes RE disposed in the touch sensor area TSA may be variously modified.

The first touch electrodes TE, the second touch electrodes RE, and second connecting electrodes BE2 may be disposed on the same layer, and the first connecting electrodes BE1 may be disposed on a different layer from the first touch electrodes TE, the second touch electrodes RE, and second connecting electrodes BE2. For example, the first connecting electrodes BE1 may be disposed below the first touch electrodes TE, the second touch electrodes RE, and second connecting electrodes BE2, while the first touch electrodes TE may be in contact with the first connecting electrodes BE1 through contact holes. However, the inventive concepts are not limited thereto. For example, in some exemplary embodiments, the first connecting electrodes BE1 may be disposed above the first touch electrodes TE, the second touch electrodes RE, and second connecting electrodes BE2.

The first touch electrode TE may be electrically connected in the second direction (or the Y-axis direction) via the first connecting electrodes BE1, and the second touch electrode RE may be electrically connected in the first direction (or the X-axis direction), which intersects the second direction (or the Y-axis direction), via the second connecting electrodes BE2. The touch sensing unit TDU_1, which has a major axis and a minor axis, may have larger sensitivity deviations in the major axis direction than in the minor axis direction, and the touch sensitivity of the entire touch sensing unit TDU_1 may decrease depending on the sensitivity deviations in the major axis direction. Accordingly, the first connecting electrodes BE1 may connect the first touch electrodes RE1, which are arranged in the minor axis direction of the of the touch sensing unit TDU_1, in the first direction (or the X-axis direction) to reduce the resistance of the second touch electrodes RE, which are arranged in the major axis direction of the touch sensing unit TDU_1, to effectively reduce the sensitivity deviations in the second touch electrodes RE. In this manner, the touch sensitivity of the entire touch sensing unit TDU_1 can be improved.

First through thirty-third driving lines TL1 through TL33 and first through sixteenth sensing lines RL1 through RL16 may be disposed in a touch peripheral area TPA. The first through thirty-third driving lines TL1 through TL33 may be electrically connected to the first touch electrodes TE, and the first through sixteenth sensing lines RL1 through RL16 may be electrically connected to the second touch electrodes RE. Specifically, the first touch electrodes TE may be electrically connected in the second direction (or the Y-axis direction). The first through thirty-third driving lines TL1 through TL33 may be connected to first touch electrodes TE disposed at one end, in the second direction (or the Y-axis direction), of the touch sensor area TSA.

For example, the first through thirty-third driving lines TL1 through TL33 may be connected to first touch electrodes TE in one-on-one arrangement at the lower end of the touch sensor area TSA that correspond to the first through thirty-third columns ER1 through ER33. The first driving line TL1 may be connected to the closest first touch electrode TE to the second long side LS2 among the first touch electrodes TE in the first column ER1, which is disposed on the far right side of the touch sensor area TSA. The thirty-third driving line TL33 may be connected to the closest first touch electrode TE to the second long side LS2 among the first touch electrodes TE in the thirty-third column ER33, which is disposed on the far left side of the touch sensor area TSA. Referring to FIG. 17, the first column ER1 is the far right column in the touch sensor area TSA, the thirty-third column ER33 is the far left column in the touch sensor area TSA, and the second through thirty-second columns ER2 through ER32 are sequentially arranged between the first and thirty-third columns ER1 and ER33.

The second touch electrodes RE are electrically connected in the first direction (or the X-axis direction). The first through sixteenth sensing lines RL1 through RL16 are electrically connected to second touch electrodes RE disposed on one or the other side of the touch sensor area TSA. The first through sixteenth sensing lines RL1 through RL16 may be divided between the left and right sides of the touch sensor area TSA.

For example, as illustrated in FIG. 17, the first through tenth sensing lines RL1 through RL10 may be disposed on the left side of the touch sensor area TSA. The first through tenth sensing lines RL1 through RL10 may be connected to second touch electrodes RE in one-on-one arrangement on the left side of the touch sensor area TSA that correspond to the first through tenth rows EC1 through EC10. The first sensing line RL1 may be connected to the closest second touch electrode RE to the first short side SS1 among the second touch electrodes RE in the first row EC1, which is the lowest column in the touch sensor area TSA. The tenth sensing line RL10 may be connected to the closest second touch electrode RE to the first short side SS1 among the second touch electrodes RE in the tenth row EC10. Referring to FIG. 17, the first row EC1 is the lowermost row in the touch sensor area TSA, and the second through tenth rows EC2 through EC10 are sequentially arranged next to the first row EC1 along the second direction (or the Y-axis direction).

The eleventh through sixteenth sensing lines RL11 through RL16 may be disposed on the right side of the touch sensor area TSA. The eleventh through sixteenth sensing lines RL11 through RL16 may be connected to second touch electrodes RE in one-on-one arrangement on the right side of the touch sensor area TSA that correspond to the eleventh through sixteenth rows EC11 through EC16. The eleventh sensing line RL11 may be connected to the closest second touch electrode RE to the second short side SS2 among the second touch electrodes RE in the eleventh row EC11. The sixteenth sensing line RL16 may be connected to the closest second touch electrode RE to the second short side SS2 among the second touch electrodes RE in the sixteenth row EC16. Referring to FIG. 17, the twelfth through sixteenth rows EC12 through EC16 are sequentially arranged next to the eleventh row EC11 along the second direction (or the Y-axis direction).

The first through tenth sensing lines RL1 through RL10 may be defined as a first sensing line group or a first second-touch line group, and the eleventh through sixteenth sensing lines RL11 through RL16 may be defined as a second sensing line group or a second second-touch line group. In this case, the first sensing line group may be disposed on the left side of the touch sensor area TSA, and the second sensing line group may be disposed on the right side of the touch sensor area TSA. In this manner, sensitivity deviations can more effectively be reduced than a configuration where sensing lines are alternately arranged in odd- and even-numbered rows, thereby improving touch sensitivity.

The first sensing line group may include 10 sensing lines, and the second sensing line group may include 6 sensing lines. That is, the number of sensing lines included in the first sensing line group may be different from the number of sensing lines included in the second sensing line group. Since the sensing lines included in the second sensing line group are longer than the sensing lines included in the first sensing line group, any resistance deviations between the first sensing line group and the second sensing line group can be minimized by forming the sensing lines included in the second sensing line group to be wider than the sensing lines included in the first sensing line group.

A first guard line GL1 may be disposed between a first ground line GRL1 and the tenth sensing line RL10 to surround part of the lower side of the touch sensor area TSA, the left side of the touch sensor area TSA, and part of the upper side of the touch sensor area TSA. A second guard line GL2 may be disposed between a second ground line GRL2 and the sixteenth sensing line RL16 to surround part of the lower side of the touch sensor area TSA, the right side of the touch sensor area TSA, and part of the upper side of the touch sensor area TSA. The ends of the first and second guard lines GL1 and GL2 may face each other on the upper side of the touch sensor area TSA, and may be spaced apart from each other in the first direction (or the X-axis direction).

A third guard line GL3 may be disposed between a third ground line GRL3 and the seventeenth driving line TL17 to face part of the lower side of the touch sensor area TSA. A fourth guard line GL4 may be disposed between a fourth ground line GRL4 and the sixteenth driving line TL16 to face part of the lower side of the touch sensor area TSA. A fifth guard line GL5 may be disposed between the first sensing line RL1 and the thirty-third driving line TL33, and a sixth guard line GL6 may be disposed between the eleventh sensing line RL11 and the first driving line TL1.

The seventeenth through thirty-third driving lines TL17 through TL33, the first through tenth sensing lines RL1 through RL10, the first, third, and fifth guard lines GL1, GL3, and GL5, and the first and third ground lines GRL1 and GRL3 may be connected to first touch pad portions TP1. The first through sixteenth driving lines TL1 through TL16, the eleventh through sixteenth sensing lines RL11 through RL16, the second, fourth, and sixth guard lines GL2, GL4, and GL6, and the second and fourth ground lines GRL2 and GRL4 may be connected to second touch pad portions TP2. Since the seventeenth through thirty-third driving lines TL17 through TL33 are disposed in an area where the first touch pad portions TP1 are disposed, and the first through sixteenth driving lines TL1 through TL16 are disposed in an area where the second touch pad portions TP2 are disposed, the uniformity of the arrangement of wiring can be improved, as well as providing an area on which display pads DP can be provided. Also, since the first through thirty-third driving lines TL1 through TL33 are connected only to the first touch electrodes TE at the lower end of the touch sensor area TSA that correspond to the first through thirty-third columns ER1 through ER33, i.e., the first through thirty-third driving lines TL1 through TL33 have a single routing structure, the size of the touch peripheral area TPA can be reduced.

Figure 18:
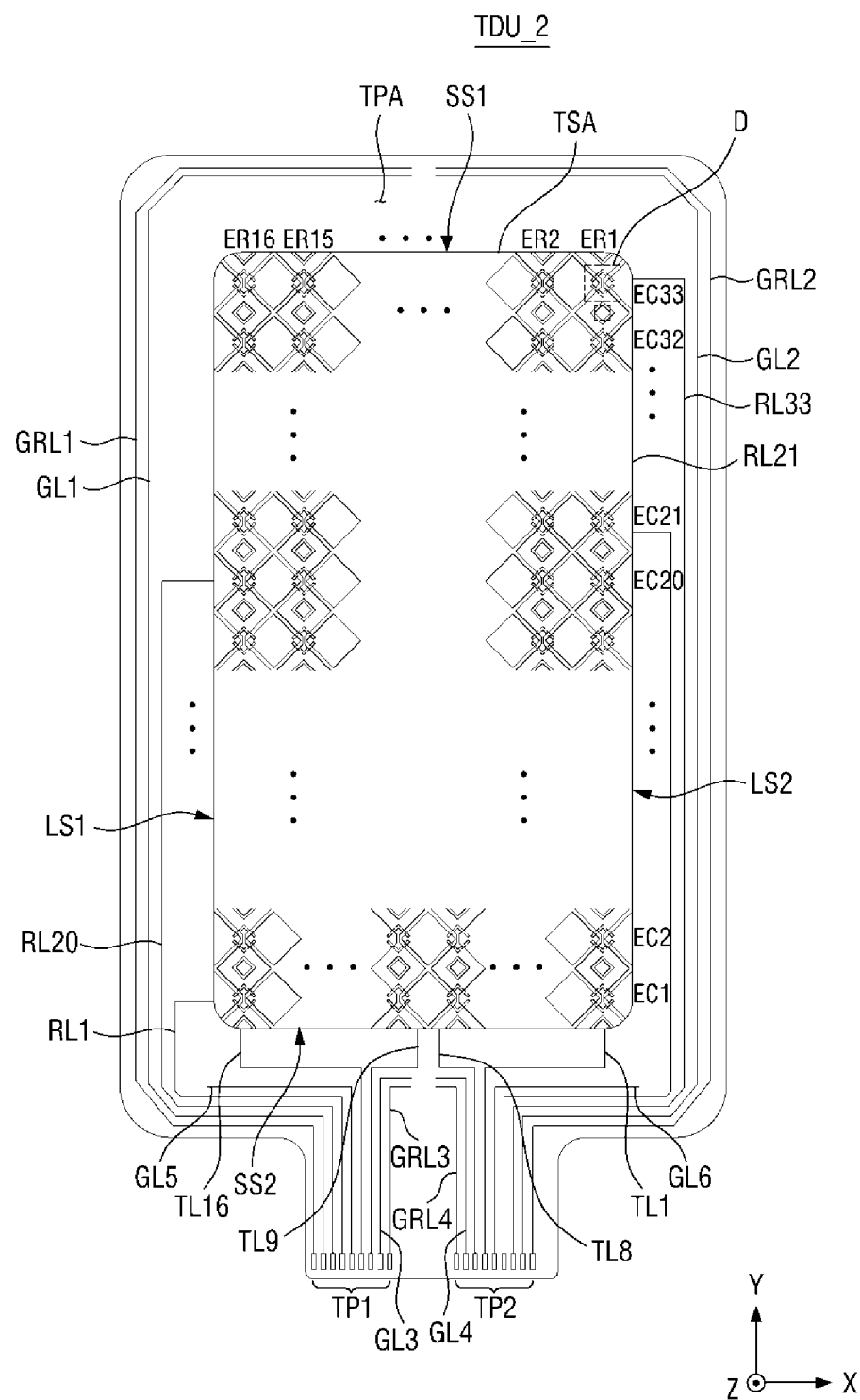
FIG. 18 is a layout view of a touch sensing unit according to another exemplary embodiment.
Figure 20:
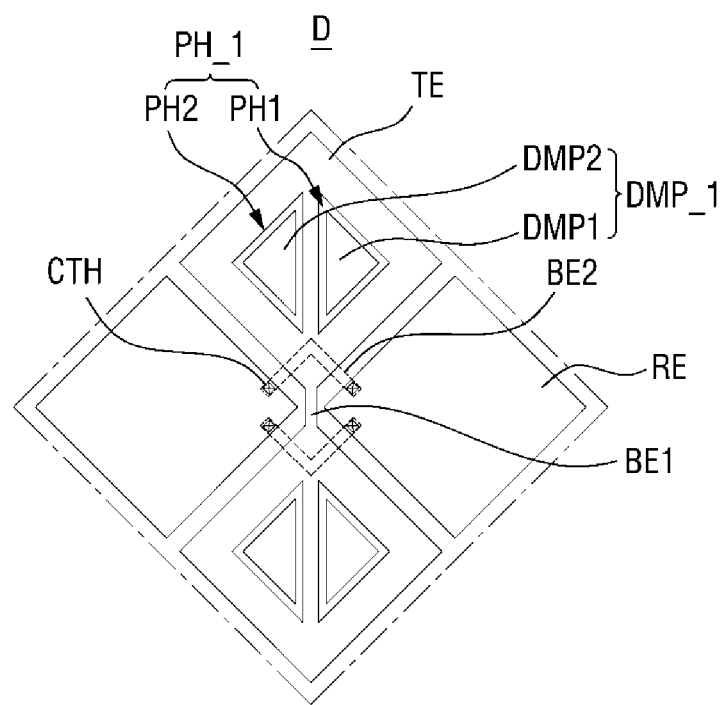
FIG. 20 is another exemplary enlarged layout view of the area D of FIG. 18.
Figure 21:
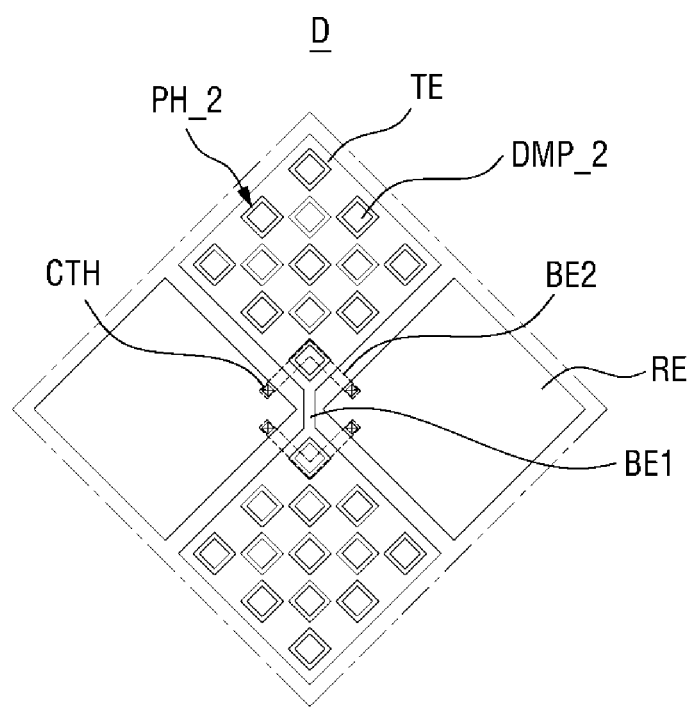
FIG. 21 is another exemplary enlarged layout view of the area D of FIG. 18.
Figure 22:
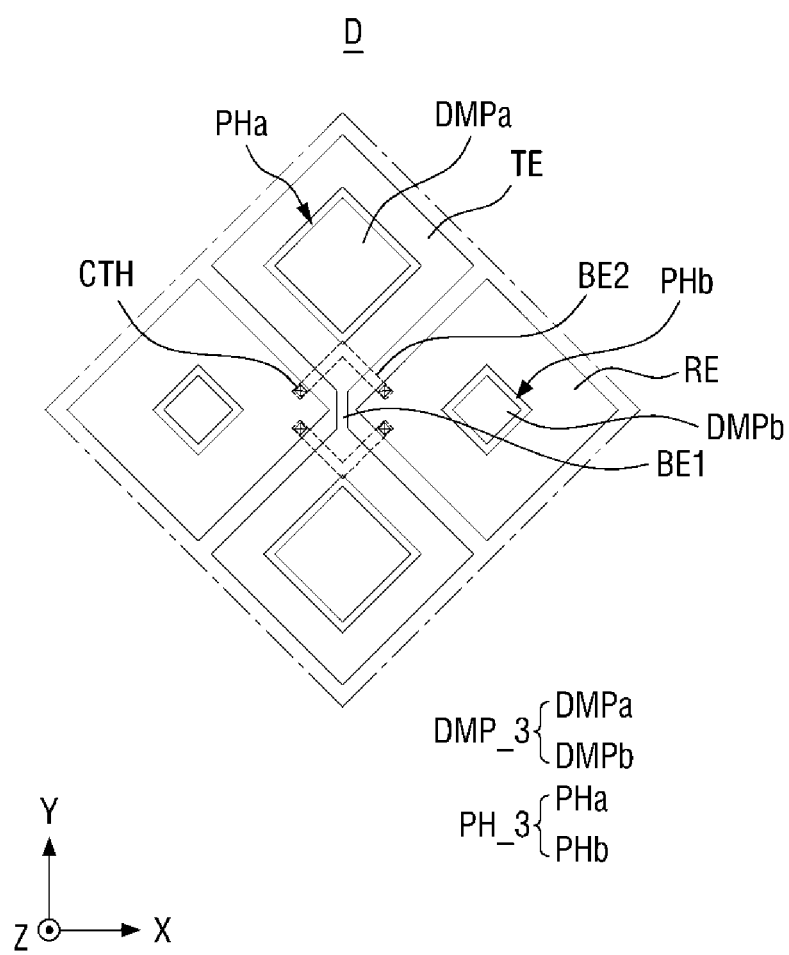
FIG. 22 is another exemplary enlarged layout view of the area D of FIG. 18.
Figure 23:
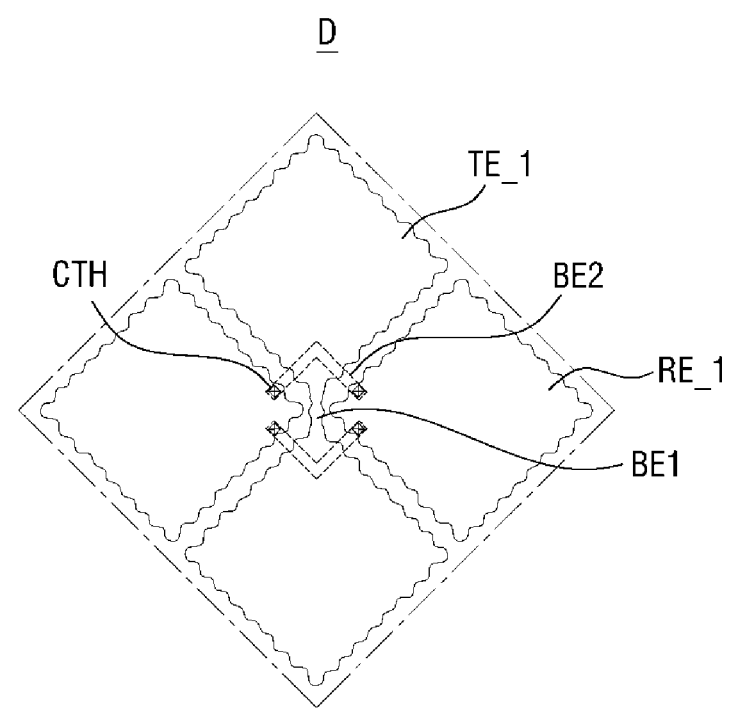
FIG. 23 is another exemplary enlarged layout view of the area D of FIG. 18.

FIG. 18 is a layout view of a touch sensing unit according to another exemplary embodiment, FIG. 19 is an exemplary enlarged layout view of an area D of FIG. 18, FIG. 20 is another exemplary enlarged layout view of the area D of FIG. 18, FIG. 21 is still another exemplary enlarged layout view of the area D of FIG. 18, FIG. 22 is yet another exemplary enlarged layout view of the area D of FIG. 18, and FIG. 23 is still yet another exemplary enlarged layout view of the area D of FIG. 18. The touch sensing units of FIGS. 18 through 23 are different from the touch sensing unit of FIG. 5, in that dummy patterns DMP are formed in touch electrodes (TE and RE). The touch sensing units of FIGS. 18 through 23 will hereinafter be described, focusing mainly on the differences with the touch sensing unit of FIG. 5.

Referring to FIGS. 18 through 23, a touch sensing unit TDU_2 may include the dummy patterns DMP. The dummy patterns DMP may be disposed on the same layer as the touch electrodes (TE and RE), and may include substantially the same material as the touch electrodes (TE and RE), without being limited thereto. For example, in some exemplary embodiments, the dummy patterns DMP may be disposed on a layer above or below the touch electrodes (TE and RE), and may include a different material from the touch electrodes (TE and RE). According to an exemplary embodiment, when the touch electrodes (TE and RE) have a mesh structure, the dummy patterns DMP may also have a mesh structure.

Pattern holes PH may be formed in the touch electrodes (TE and RE) to which the dummy patterns DMP may be arranged. For example, the touch electrodes (TE and RE) may have at least their centers opened to expose the layer disposed therebelow. For example, if a first insulating layer IL1 is disposed below the touch electrodes (TE and RE), part of the first insulating layer IL may be exposed through the pattern holes PH.

The pattern holes PH, to which the dummy patterns DMP may be arranged, may have a larger area than the dummy patterns DMP. As such, the dummy patterns DMP in the pattern holes PH may be spaced apart from the touch electrodes (TE and RE). More particularly, the dummy patterns DMP may be arranged in the pattern holes PH in the form of islands and may be floated, but the inventive concepts are not limited thereto. For example, in some exemplary embodiments, a ground voltage may be applied to the dummy patterns DMP. By providing the dummy patterns DMP in the touch electrodes (TE and RE) of the touch sensing unit TDU_2, the parasitic capacitance of the touch electrodes (TE and RE) can be reduced.

In some exemplary embodiments, as illustrated in FIGS. 18 and 19, the dummy patterns DMP may have a rhombic shape, and may be disposed in the pattern holes PH of first touch electrodes TE. For example, the first touch electrodes TE may be spaced apart from one another in the second direction (or the Y-axis direction), and pairs of adjacent first touch electrodes TE in the second direction (or the Y-axis direction) may be electrically connected via first connecting electrodes BE1, and second touch electrodes RE may be spaced apart from one another in the first direction (or the X-axis direction), and pairs of adjacent second touch electrodes RE in the first direction (or the X-axis direction) may be electrically connected via second connecting electrodes BE2. The first touch electrodes TE may have rhombic pattern holes PH, and dummy patterns DMP having the same shape as, but a smaller in size than, the pattern holes PH may be disposed in the pattern holes PH.

In some exemplary embodiments, as illustrated in FIG. 20, each dummy pattern DMP_1 may include first and second dummy pattern units DMP1 and DMP2. The first and second dummy pattern units DMP1 and DMP2 may have a triangular shape. A pattern hole PH_1 including first and second pattern hole units PH1 and PH2, which are spaced apart from each other and have a triangular shape, may be disposed in each first touch electrode TE. The first and second dummy pattern units DMP1 and DMP2 may be disposed in the first and second pattern hole units PH1 and PH2, respectively.

In some exemplary embodiments, as illustrated in FIG. 21, dummy patterns DMP_2 may have a rhombic shape and may be disposed in pattern holes PH_2 of each first touch electrode TE. For example, a plurality of pattern holes PH2 may be disposed in each first touch electrode TE, and may be spaced apart from one another, and the dummy patterns DMP_2 may be disposed in the plurality of pattern holes PH_2.

In some exemplary embodiments, as illustrated in FIG. 22, dummy patterns DMP_3 may be disposed in pattern holes PH_3 of touch electrodes (TE and RE).

First touch electrodes TE may include first pattern holes PHa, and second touch electrodes RE may include second pattern holes PHb. The first pattern holes PHa may have a different area from the second pattern holes PHb. For example, the first pattern holes PHa may have a larger area than the second pattern holes PHb.

The dummy patterns DMP_3 may include first dummy patterns DMPa and second dummy patterns DMPb. For example, the first dummy patterns DMPa may have a larger area than the second dummy patterns DMPb.

The first dummy patterns DMPa may be disposed in the first pattern holes PHa of the first touch electrodes TE, and the second dummy patterns DMPb may be disposed in the second pattern holes PHb of the second touch electrodes RE. The first dummy patterns DMPa, which have a relatively large area, may be disposed in the first touch electrodes TE, which have a relatively large parasitic capacitance.

In some exemplary embodiments, as illustrated in FIG. 23, touch electrodes (TE_1 and RE_1) may have sides that are in zigzags. FIG. 23 illustrates that each of the sides of each of the touch electrodes (TE_1 and RE_1) is in zigzags, but the inventive concepts are not limited thereto. For example, in another exemplary embodiment, at least one side of each first touch electrodes TE1 and/or at least one side of each second touch electrode RE_1 may be in zigzags. When the sides of each of the touch electrodes (TE_1 and RE_1) are in zigzags, moiré can be prevented from being visible to a user, and as a result, any display defects that may be caused by moiré interference can be suppressed.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a substrate;
    a plurality of pixels on the substrate, each of the pixels comprising a thin film transistor and a light emitting layer;
    a plurality of data lines on the substrate, each of the data lines being electrically connected to the thin film transistor of some of the pixels;
    a first insulating layer covering the pixels;
    a plurality of first touch lines on the substrate;
    a plurality of second touch lines on the substrate;
    a second insulating layer having a plurality of contact holes on connecting electrodes;
    a plurality of first touch electrodes arranged on the second insulating layer, wherein each of the first touch lines is electrically connected to some of the first touch electrodes by at least one of the connecting electrodes through at least two of the contact holes;
    a plurality of second touch electrodes arranged on the second insulating layer, wherein each of the second touch lines is electrically connected to some of second touch electrodes by an extended portion between two of the second touch electrodes, the second touch electrodes overlapping one of the connecting electrodes;
    an integrated circuit electrically connected to the data lines on the substrate;
    a plurality of first pads, wherein each of the first pads is connected to the integrated circuit;
    a plurality of guard lines; and
    a plurality of second pads comprising a first group, a second group, and a third group,
    wherein each of the second pads of the first group is electrically connected to one of the first touch lines, each of the second pads of the second group is electrically connected to one of the second touch lines, each of the second pads of the third group is electrically connected to one of the guard lines, and
    wherein one of the second pads of the third group is positioned between one of the second pads of the first group and one of the second pads of the second group.

2. The display device of the claim 1, wherein a thickness of the connecting electrodes is less than a thickness of the first touch lines.

3. The display device of the claim 2, wherein the first pads and the second pads are on a protruding portion of the substrate protruded outwardly from a portion of the substrate on which the pixels are arranged.

4. The display device of the claim 3, wherein the second pads are grouped into two portions, and
    wherein each of the two portions of the second pads comprises the first group of the second pads, the second group of the second pads, and the third group of the second pads respectively.

5. The display device of the claim 4, wherein the second group of the second pads is arranged closer than the first group of the second pads to the first pads.

6. The display device of the claim 5, wherein the first touch electrodes and the second touch electrodes comprise a plurality of meshes.

7. The display device of the claim 6, wherein the first touch electrodes and the second touch electrodes further comprise a plurality of pattern holes.

8. The display device of the claim 1, wherein the second pads are grouped into two portions, and
    wherein each of the two portions comprises the first group of the second pads, the second group of the second pads, and the third group of the second pads, respectively.

9. The display device of the claim 8, wherein the second group of the second pads is arranged closer than the first group of the second pads to the first pads.

10. The display device of the claim 9, wherein the first touch electrodes and the second touch electrodes comprise a plurality of meshes.

11. The display device of the claim 10, wherein the first touch electrodes and the second touch electrodes further comprise a plurality of pattern holes.

12. The display device of the claim 1, wherein the first touch electrodes electrically connected to one of the first touch lines are horizontally arranged side by side.

13. The display device of the claim 12, wherein the second touch electrodes electrically connected to one of the second touch lines are vertically arranged side by side.

14. The display device of the claim 13, wherein the second pads are grouped into two portions, and
    wherein each of the two portions comprises the first group, the second group, and the third group, respectively.

15. The display device of the claim 14, wherein the second group of the second pads is arranged closer than the first group of the second pads to the first pads.

16. The display device of the claim 15, wherein the first touch electrodes and the second touch electrodes comprise a plurality of meshes.

17. The display device of the claim 16, wherein the first touch electrodes and the second touch electrodes further comprise a plurality of pattern holes.

18. The display device of the claim 1, wherein the second pads of the second group are arranged between two of the second pads of the first group.

19. The display device of the claim 18, wherein the first touch electrodes and the second touch electrodes comprise a plurality of meshes.

20. The display device of the claim 19, wherein the first touch electrodes and the second touch electrodes further comprise a plurality of pattern holes.

* * * * *